US012786716B2

(12) United States Patent
Jiang et al.

(10) Patent No.: US 12,786,716 B2
(45) Date of Patent: Nov. 3, 2026

(54) COMMUNICATION METHOD AND APPARATUS

(71) Applicant: Huawei Technologies Co., Ltd., Shenzhen (CN)

(72) Inventors: Weiyu Jiang, Beijing (CN); Fei Yang, Beijing (CN); Chuang Wang, Shenzhen (CN); Juanna Dang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 18/604,980

(22) Filed: Mar. 14, 2024

(65) Prior Publication Data

US 2024/0224039 A1 Jul. 4, 2024

Related U.S. Application Data

(63) Continuation of application No. PCT/CN2022/115879, filed on Aug. 30, 2022.

(30) Foreign Application Priority Data

Sep. 15, 2021 (CN) ........................ 202111083005.1

(51) Int. Cl.
*H04W 12/106* (2021.01)
*H04W 12/122* (2021.01)
*H04W 12/71* (2021.01)

(52) U.S. Cl.
CPC ....... *H04W 12/106* (2021.01); *H04W 12/122* (2021.01); *H04W 12/71* (2021.01)

(58) Field of Classification Search
CPC .. H04W 12/106; H04W 12/71; H04W 12/122
See application file for complete search history.

(56) References Cited

U.S. PATENT DOCUMENTS

2007/0025342 A1* 2/2007 Obata .................... H04L 63/12 370/352
2018/0302389 A1* 10/2018 Kariyanahalli ....... H04L 63/166

FOREIGN PATENT DOCUMENTS

CN 112235313 A 1/2021

* cited by examiner

*Primary Examiner* — John J Lee
(74) *Attorney, Agent, or Firm* — Slater Matsil, LLP

(57) ABSTRACT

In accordance with an embodiment, a method applied to a first network device includes receiving a first packet from a terminal; and sending a second packet to a second network device, where the second packet is obtained by encapsulating security information in the first packet, and the security information indicates that the second packet is a trusted packet determined by the first network device.

30 Claims, 7 Drawing Sheets

COMMUNICATION METHOD AND APPARATUS

CROSS-REFERENCE TO RELATED APPLICATION

This application is a continuation of International Patent Application No. PCT/CN2022/115879 filed on Aug. 30, 2022, which claims priority to Chinese Patent Application No. 202111083005.1 filed on Sep. 15, 2021. The disclosures of the aforementioned applications are hereby incorporated by reference in their entireties.

TECHNICAL FIELD

This application relates to the communication field, and in particular, to a communication method and apparatus.

BACKGROUND

In the network security field, some network security solutions, such as a blackhole solution and a traffic cleaning solution, may be deployed, to prevent abnormal service packets, such as attack packets, malicious packets, untrusted packets, and packets with low security levels, from attacking corresponding devices, so as to avoid data leakage, device breakdown, and the like.

For the blackhole solution, a device attacked by a packet (referred to as an attacked device below) may send all received traffic to a black hole, namely, a device dedicated to receiving the traffic, to ensure that the attacked device is not affected again. However, the traffic sent to the black hole also includes a normal service packet. As a result, service interruption is caused, and service continuity cannot be ensured. For the traffic cleaning solution, an attacked device may send all received traffic to a high-defense cleaning center. The high-defense cleaning center performs deep parsing on packets to identify normal and abnormal service packets and return the normal service packets to the attacked device, to ensure continuity of services. However, it takes a long time for the high-defense cleaning center to perform deep parsing on the packets. As a result, the services are greatly delayed, and real-time performance of the services cannot be ensured.

SUMMARY

Embodiments of this application provide a communication method and apparatus, to ensure continuity and real-time performance of a service while defending against a packet attack.

According to a first aspect, a communication method is provided. The method includes: A first network device receives a first packet from a terminal, and sends a second packet to a second network device. The second packet is a packet obtained by encapsulating security information in the first packet. The security information indicates that the second packet is a trusted packet determined by the first network device.

It can be learned from the method according to the first aspect that the security information is encapsulated in the first packet, so that the obtained second packet is the trusted packet determined by the first network device. In this way, the second network device can determine, based on the security information encapsulated in the second packet and without performing deep parsing on the second packet, whether the second packet is an attack packet. This can ensure continuity and real-time performance of a service while defending against a packet attack.

In a possible design solution, the security information may include first verification information, and the first verification information indicates that the second packet is the trusted packet determined by the first network device. Optionally, the first verification information is password protection information. This can prevent the security information from being forged or falsified, thereby improving a trustworthiness level of the security information.

Optionally, the security information may further include second verification information, and the second verification information may include one or more of the following: an identifier of a verification algorithm, anti-replay information, an identifier of the first network device, a key ciphertext, an identifier of the second network device, an internal reachable address of a third device, or first indication information. The third device is a downstream device of the second network device, and the first indication information indicates a type of the security information. The one or more pieces of the foregoing information carried in the second verification information is mainly used for verification and forwarding by the second network device. In other words, the second network device can use the information to verify the security information, and forward a third packet by using the information. In this case, the information is carried in the packet, so that the second network device does not need to dynamically maintain the information locally, thereby saving processing resources of the second network device, and improving resource utilization and operating efficiency of the second network device.

Optionally, the second verification information may further include second indication information, and the second indication information indicates whether the security information includes one or more of the following: the identifier of the verification algorithm, the anti-replay information, the identifier of the first network device, or the key ciphertext.

Optionally, the second verification information may further include the second indication information, and the second indication information indicates a location and/or a length of one or more of the following in the second packet: the first verification information, the identifier of the verification algorithm, the anti-replay information, the identifier of the first network device, or the key ciphertext.

In this way, the second network device can accurately extract the one or more pieces of the foregoing information from the second packet based on the second indication information, to ensure accuracy and reliability of subsequent verification, and avoid a verification failure caused by a failure of the second network device to accurately extract the one or more pieces of the foregoing information. Because the second indication information can indicate the location and/or the length of the one or more pieces of the foregoing information in the second packet, the one or more pieces of the foregoing information can be encapsulated in the second packet more flexibly, so that the second packet is more flexible in structure and better in service compatibility, and is applicable to more service scenarios.

Optionally, the first verification information may be in a header or a tail of the second packet, and the second verification information may be in the header or the tail of the second packet. It may be understood that the second network device sequentially parses the second packet from the header to the tail of the second packet. On this basis, in an optional manner, the first verification information is encapsulated in the tail of the second packet, and the second verification information is encapsulated in the header of the second packet, so that the second network device can synchronously process the second verification information and parse the second packet. For example, when the second network device prepares for verification based on the second verification information, the second network device synchronously parses the tail of the second packet, and extracts the first verification information, to verify the second packet immediately, avoid excessively long waiting time, and improve verification efficiency of the second network device.

Optionally, the second packet is an internet protocol version 4 IPv4 packet or an internet protocol version 6 IPv6 packet. The second verification information is located between an IPv4 header and a payload of the IPV4 packet when the second packet is the IPv4 packet, or the second verification information is located in an extension header of an IPV6 protocol header of the IPV6 packet when the second packet is the IPV6 packet. In this way, the second verification information is compatible with the current IPV4 or the IPV6 packet, the protocol change is less, and practical application is more convenient.

Optionally, before that a first network device sends a second packet to a second network device, the method according to the first aspect may further include: The first network device receives first configuration information from a network controller. The first configuration information may include one or more of the following: a public address of the third device, the first verification information, the verification algorithm, the identifier of the verification algorithm, the anti-replay information, a first key, the anti-replay information, the identifier of the first network device, the key ciphertext, the identifier of the second network device, the internal reachable address of the third device, the first indication information, or the second indication information. The verification algorithm, the anti-replay information, and the first key are used to determine the first verification information. The network controller configures the first configuration information for the first network device, so that the first network device can encapsulate the security information in the first packet based on the first configuration information, to obtain the second packet. In this way, the second network device can determine, based on the security information encapsulated in the second packet and without performing deep parsing on the second packet, whether the second packet is an attack packet. This can ensure continuity and real-time performance of a service while defending against a packet attack.

Optionally, destination addresses of the first packet and the second packet are the public address of the third device. The public address of the third device means that the address points to the third device but is unreachable to the third device. In other words, the packet carrying the public address of the third device cannot be directly sent to the third device, but may be sent to a network device that is reachable to the third device, for example, the first network device or the second network device. After determining that the packet is not an attack packet, these network devices update a destination address of the packet to the internal reachable address of the third device, and then forward the packet to the third device, to prevent the third device from being directly attacked by the packet.

In a possible design solution, the first network device is any one of the following: a router, a gateway, or a switch, and the second network device is a router. In other words, the method according to the first aspect may be applied to routing and forwarding scenarios, to implement inter-area, inter-region, or inter-network-layer packet attack defense in a forwarding scenario.

According to a second aspect, a communication method is provided. The method includes: A second network device receives a second packet from a first network device, and verifies the second packet. Security information is encapsulated in the second packet, and the security information indicates that the second packet is a trusted packet determined by the first network device.

In a possible design solution, the security information may include first verification information, and the first verification information indicates that the second packet is the trusted packet determined by the first network device. Optionally, the first verification information is password protection information.

Optionally, the security information may further include second verification information, and the second verification information may include one or more of the following: an identifier of a verification algorithm, anti-replay information, an identifier of the first network device, a key ciphertext, an identifier of the second network device, an internal reachable address of a third device, or first indication information. The first indication information indicates a type of the security information.

Optionally, the second verification information may further include second indication information, and the second indication information indicates whether the security information includes one or more of the following: the identifier of the verification algorithm, the anti-replay information, the identifier of the first network device, or the key ciphertext.

Optionally, the second verification information may further include the second indication information, and the second indication information indicates a location and/or a length of one or more of the following in the second packet: the first verification information, the identifier of the verification algorithm, the anti-replay information, the identifier of the first network device, or the key ciphertext.

Optionally, the first verification information is in a header or a tail of the second packet, and the second verification information is in the header or the tail of the second packet.

Optionally, the second packet is an internet protocol version 4 IPV4 packet or an internet protocol version 6 IPv6 packet. The second verification information is located between an IPV4 header and a payload of the IPV4 packet when the second packet is the IPV4 packet, or the second verification information is located in an extension header of an IPV6 protocol header of the IPV6 packet when the second packet is the IPV6 packet.

Optionally, that a second network device verifies the second packet may include: The second network device determines third verification information based on the second verification information, to verify the second packet based on the first verification information and the third verification information.

Further, that the second network device verifies the second packet based on the first verification information and the third verification information may include: If the first verification information is the same as the third verification information, the second network device updates a destination address of the second packet to the internal reachable address of the third device, to obtain a third packet, and sends the third packet to the third device; or if the first verification information is different from the third verification information, the second network device discards the second packet. In this way, whether the first verification information is the same as the third verification information is compared, and it can be accurately identified whether the first verification information is falsified, whether the first verification information is forged information, and the like, thereby improving security and reliability of verification.

Further, that the second network device determines third verification information based on the second verification information may include: The second network device determines a second key based on the key ciphertext or the identifier of the first network device, to determine the third verification information based on the verification algorithm, the anti-replay information, and the second key. It can be learned that the second key is not directly carried in the security information, but needs to be determined by the second network device based on the key ciphertext or the identifier of the first network device. In other words, the second key is a sufficiently secure key, and is difficult to forge or falsify. Therefore, when sufficient security of the second key is ensured, an attack packet usually can only falsify or forge other information, such as the verification algorithm and the anti-replay information. However, in the verification process, the third verification information is determined based on the verification algorithm, the anti-replay information, and the second key. Once information such as the verification algorithm and the anti-replay information is forged or falsified, the third verification information is different from the first verification information, and the verification fails. In this way, whether the second packet is a forged or falsified attack packet can be reliably and securely checked.

Optionally, that the second network device determines third verification information based on the second verification information may include: The second network device determines whether the security information includes the identifier of the first network device, and determines the third verification information based on the second verification information if the second network device determines that the security information includes the identifier of the first network device. Alternatively, that the second network device verifies the second packet may include: The second network device determines that the security information does not include the identifier of the first network device, and the second network device discards the second packet, or the second network device sends the second packet to a high-defense cleaning center.

If the second packet carries the identifier of the first network device, it indicates that the second packet is a trusted packet from a trusted device, for example, the first network device. Based on this principle, if the second packet does not include the identifier of the first network device, it indicates that the second packet is an untrusted packet. In this case, the second network device may no longer verify the second packet, but send the second packet to the high-defense cleaning center. In this way, processing resources of the second network device can be saved, and operation efficiency of the second network device can be improved. In addition, the second packet is the untrusted packet, it does not indicate that the second packet is an attack packet, and the second packet may also be a regular data packet from the internet. Therefore, when it can be ensured that the second packet is the regular data packet after the second network device sends the second packet to the high-defense cleaning center, the second packet can still normally access the third device, to ensure reliability and stability of a service. However, if the verification still fails when the second packet carries the identifier of the first network device, it indicates that the second packet may be the falsified or forged attack packet, and the second network device may discard the second packet, and no longer send the second packet to the high-defense cleaning center, to save processing resources of the high-defense cleaning center.

In a possible design solution, before that a second network device verifies the second packet, the method according to the second aspect may further include: The second network device receives second configuration information from a network controller, where the second configuration information includes one or more of the following: the internal reachable address of the third device, the identifier of the second network device, the identifier of the first network device, or a third key, where the third key is used to decrypt the key ciphertext to obtain the second key. It can be learned that the network controller configures the second configuration information for the second network device, so that the second network device can verify the second packet based on the second configuration information, to determine whether the second packet is an attack packet, and does not need to perform deep parsing on the second packet. This can ensure continuity and real-time performance of a service while defending against a packet attack.

In a possible design solution, the first network device is any one of the following: a router, a gateway, or a switch, and the second network device is a router.

In addition, for another technical effect of the method according to the second aspect, refer to the technical effects of the method according to the first aspect. Details are not described herein again.

According to a third aspect, a communication apparatus is provided. The communication apparatus may be used in the first network device in the first aspect. The communication apparatus may be a router, a gateway, or a switch, may be an apparatus in a router, a gateway, or a switch (for example, a chip, a chip system, or a circuit), or may be an apparatus that can be used in a manner of being matched with a router, a gateway, or a switch. In a possible implementation, the communication apparatus may include a corresponding module or unit for performing the method/operation/step/action described in the first aspect. The module or unit may be a hardware circuit or software, or may be implemented by a hardware circuit in combination with software.

In a possible implementation, the communication apparatus according to the third aspect includes a transceiver module and a processing module. The transceiver module is configured to receive a first packet from a terminal. The processing module is configured to obtain the second packet. The transceiver module is configured to send the second packet to a second network device. The second packet is a packet obtained by encapsulating security information in the first packet. The security information indicates that the second packet is a trusted packet determined by the communication apparatus.

In a possible design solution, the security information may include first verification information, and the first verification information indicates that the second packet is the trusted packet determined by the communication apparatus according to the third aspect. Optionally, the first verification information is password protection information.

Optionally, the security information may further include second verification information, and the second verification information may include one or more of the following: an identifier of a verification algorithm, anti-replay information, an identifier of the communication apparatus according to the third aspect, a key ciphertext, an identifier of the second network device, an internal reachable address of a third device, or first indication information. The third device is a downstream device of the second network device, and the first indication information indicates a type of the security information.

Optionally, the second verification information may further include second indication information, and the second indication information indicates whether the security information includes one or more of the following: the identifier of the verification algorithm, the anti-replay information, the identifier of the communication apparatus according to the third aspect, or the key ciphertext.

Optionally, the second verification information may further include the second indication information, and the second indication information indicates a location and/or a length of one or more of the following in the second packet: the first verification information, the identifier of the verification algorithm, the anti-replay information, the identifier of the communication apparatus according to the third aspect, or the key ciphertext.

Optionally, the first verification information may be in a header or a tail of the second packet, and the second verification information may be in the header or the tail of the second packet.

Optionally, the second packet is an internet protocol version 4 IPv4 packet or an internet protocol version 6 IPv6 packet. The second verification information is located between an IPV4 header and a payload of the IPV4 packet when the second packet is the IPV4 packet, or the second verification information is located in an extension header of an IPV6 protocol header of the IPV6 packet when the second packet is the IPV6 packet.

Optionally, the transceiver module is further configured to: before sending the second packet to the second network device, receive first configuration information from a network controller. The first configuration information may include one or more of the following: a public address of the third device, the first verification information, the verification algorithm, the identifier of the verification algorithm, the anti-replay information, a first key, the anti-replay information, the identifier of the communication apparatus according to the third aspect, the key ciphertext, the identifier of the second network device, the internal reachable address of the third device, the first indication information, or the second indication information. The verification algorithm, the anti-replay information, and the first key are used to determine the first verification information.

Optionally, destination addresses of the first packet and the second packet are the public address of the third device.

In a possible design solution, the apparatus according to the third aspect is any one of the following: a router, a gateway, or a switch, and the second network device is a router.

Optionally, the transceiver module may alternatively include a sending module and a receiving module. The sending module is configured to implement a sending function of the apparatus according to the third aspect, and the receiving module is configured to implement a receiving function of the apparatus according to the third aspect.

Optionally, the apparatus according to the third aspect may further include a storage module, and the storage module stores a program or instructions. When the processing module executes the program or the instructions, the apparatus can perform the method according to the first aspect.

In addition, for a technical effect of the apparatus according to the third aspect, refer to the technical effects of the method according to the first aspect. Details are not described herein again.

According to a fourth aspect, a communication apparatus is provided. The communication apparatus may be used in the second network device in the second aspect. The communication apparatus may be a router, may be an apparatus in a router (for example, a chip, a chip system, or a circuit), or may be an apparatus that can be used in a manner of being matched with a router. In a possible implementation, the communication apparatus may include a corresponding module or unit for performing the method/operation/step/action described in the second aspect. The module or unit may be a hardware circuit or software, or may be implemented by a hardware circuit in combination with software.

In a possible implementation, the communication apparatus according to the fourth aspect includes a transceiver module and a processing module. The transceiver module is configured to receive a second packet from a first network device. The processing module is configured to verify the second packet. Security information is encapsulated in the second packet, and the security information indicates that the second packet is a trusted packet determined by the first network device.

In a possible design solution, the security information may include first verification information, and the first verification information indicates that the second packet is the trusted packet determined by the first network device. Optionally, the first verification information is password protection information.

Optionally, the security information may further include second verification information, and the second verification information may include one or more of the following: an identifier of a verification algorithm, anti-replay information, an identifier of the first network device, a key ciphertext, an identifier of the communication apparatus according to the fourth aspect, an internal reachable address of a third device, or first indication information. The first indication information indicates a type of the security information.

Optionally, the second verification information may further include second indication information, and the second indication information indicates whether the security information includes one or more of the following: the identifier of the verification algorithm, the anti-replay information, the identifier of the first network device, or the key ciphertext.

Optionally, the second verification information may further include the second indication information, and the second indication information indicates a location and/or a length of one or more of the following in the second packet: the first verification information, the identifier of the verification algorithm, the anti-replay information, the identifier of the first network device, or the key ciphertext.

Optionally, the first verification information is in a header or a tail of the second packet, and the second verification information is in the header or the tail of the second packet.

Optionally, the second packet is an internet protocol version 4 IPV4 packet or an internet protocol version 6 IPv6 packet. The second verification information is located between an IPV4 header and a payload of the IPV4 packet when the second packet is the IPV4 packet, or the second verification information is located in an extension header of an IPV6 protocol header of the IPV6 packet when the second packet is the IPV6 packet.

Optionally, the processing module is further configured to: determine third verification information based on the second verification information, to verify the second packet based on the first verification information and the third verification information.

Further, if the first verification information is the same as the third verification information, the processing module is further configured to: update a destination address of the second packet to the internal reachable address of the third device, to obtain a third packet, and control the transceiver module to send the third packet to the third device. Alternatively, if the first verification information is different from the third verification information, the processing module is further configured to discard the second packet.

Further, the processing module is further configured to: determine a second key based on the key ciphertext or the identifier of the first network device, to determine the third verification information based on the verification algorithm, the anti-replay information, and the second key.

Optionally, the processing module is further configured to: before determining the third verification information based on the second verification information, determine that the security information includes the identifier of the first network device. Alternatively, the processing module is further configured to: determine that the security information does not include the identifier of the first network device, and the processing module discards the second packet, or controls the transceiver module to send the second packet to a high-defense cleaning center.

In a possible design solution, the transceiver module is further configured to: before the processing module verifies the second packet, receive second configuration information from a network controller. The second configuration information includes one or more of the following: the internal reachable address of the third device, the identifier of the communication apparatus according to the fourth aspect, the identifier of the first network device, or a third key. The third key is used to decrypt the key ciphertext to obtain the second key.

In a possible design solution, the first network device is any one of the following: a router, a gateway, or a switch, and the communication apparatus according to the fourth aspect is a router.

Optionally, the transceiver module may alternatively include a sending module and a receiving module. The sending module is configured to implement a sending function of the apparatus according to the fourth aspect, and the receiving module is configured to implement a receiving function of the apparatus according to the fourth aspect.

Optionally, the apparatus according to the fourth aspect may further include a storage module, and the storage module stores a program or instructions. When the processing module executes the program or the instructions, the apparatus can perform the method according to the second aspect.

In addition, for a technical effect of the apparatus according to the fourth aspect, refer to the technical effects of the method according to the second aspect. Details are not described herein again.

According to a fifth aspect, a communication apparatus is provided. The apparatus includes a processor. The processor is configured to perform the method according to the first aspect or the second aspect.

In a possible design solution, the apparatus according to the fifth aspect may further include a transceiver. The transceiver may be a transceiver circuit or an interface circuit. The transceiver may be used by the apparatus to communicate with another apparatus.

In a possible design solution, the apparatus according to the fifth aspect may further include a memory. The memory and the processor may be integrated together, or may be disposed separately. The memory may be configured to store a computer program (or a group of instructions) and/or data related to the method according to the first aspect or the second aspect.

In this application, the apparatus according to the fifth aspect may be the network device according to the first aspect or the second aspect, a chip (system) or another component or subassembly that may be disposed in the network device, or an apparatus including the network device.

In addition, for a technical effect of the apparatus according to the fifth aspect, refer to the technical effects of the method according to the first aspect or the second aspect. Details are not described herein again.

According to a sixth aspect, a communication apparatus is provided. The apparatus includes a processor coupled to a memory. The memory is configured to store computer instructions. When the processor executes the instructions, the apparatus performs the method according to the first aspect or the second aspect.

In a possible design solution, the apparatus according to the sixth aspect may further include a transceiver. The transceiver may be a transceiver circuit or an interface circuit. The transceiver may be used by the apparatus to communicate with another apparatus.

In this application, the apparatus according to the sixth aspect may be the network device according to the first aspect or the second aspect, a chip (system) or another component or subassembly that may be disposed in the network device, or an apparatus including the network device.

In addition, for a technical effect of the apparatus according to the sixth aspect, refer to the technical effects of the method according to the first aspect or the second aspect. Details are not described herein again.

According to a seventh aspect, a communication apparatus is provided. The apparatus includes a logic circuit and an input/output interface.

In a possible implementation, the communication apparatus according to the seventh aspect is applicable to the network device according to the first aspect, for example, the first network device, a chip (system) or another component or subassembly that may be disposed in the network device, or an apparatus including the network device.

The input/output interface is configured to receive a first packet from a terminal. The logic circuit is configured to obtain a second packet. The input/output interface is further configured to send the second packet to a second network device. The second packet is a packet obtained by encapsulating security information in the first packet. The security information indicates that the second packet is a trusted packet determined by the communication apparatus.

Optionally, the apparatus according to the seventh aspect may further include a transceiver. The transceiver may be a transceiver circuit or an interface circuit. The transceiver may be used by the apparatus to communicate with another apparatus.

Optionally, the apparatus according to the seventh aspect may further include a memory. The memory and a processor may be integrated together, or may be disposed separately. The memory may be configured to store a computer program and/or data related to the method according to the first aspect.

In another possible implementation, the communication apparatus according to the seventh aspect is applicable to the network device according to the second aspect, for example, the second network device, a chip (system) or another component or subassembly that may be disposed in the network device, or an apparatus including the network device.

The input/output interface is configured to receive a second packet from a first network device. The logic circuit is configured to verify the second packet. Security information is encapsulated in the second packet, and the security information indicates that the second packet is a trusted packet determined by the first network device.

Optionally, the apparatus according to the seventh aspect may further include a transceiver. The transceiver may be a transceiver circuit or an interface circuit. The transceiver may be used by the apparatus to communicate with another apparatus.

Optionally, the apparatus according to the seventh aspect may further include a memory. The memory and a processor may be integrated together, or may be disposed separately. The memory may be configured to store a computer program and/or data related to the method according to the second aspect.

In addition, for a technical effect of the apparatus according to the seventh aspect, refer to the technical effects of the method according to the first aspect or the second aspect. Details are not described herein again.

According to an eighth aspect, a communication apparatus is provided. The apparatus includes a processor and a transceiver. The transceiver is configured to exchange information between the communication apparatus and another apparatus. The processor executes program instructions to perform the method according to the first aspect or the second aspect.

In a possible design solution, the apparatus according to the eighth aspect may further include a memory. The memory and the processor may be integrated together, or may be disposed separately. The memory may be configured to store a computer program and/or data related to the method according to the first aspect or the second aspect.

In this application, the apparatus according to the eighth aspect may be the network device according to the first aspect or the second aspect, a chip (system) or another component or subassembly that may be disposed in the network device, or an apparatus including the network device.

In addition, for a technical effect of the apparatus according to the eighth aspect, refer to the technical effects of the method according to the first aspect or the second aspect. Details are not described herein again.

According to a ninth aspect, a communication system is provided. The communication system includes the network device in the method according to the first aspect, for example, the first network device and a positioning management network element, and includes the network device in the method according to the second aspect, for example, the second network device.

According to a tenth aspect, a computer-readable storage medium is provided, including a computer program. When the computer program is run on a computer, the method according to the first aspect or the second aspect is performed.

According to an eleventh aspect, a computer program product is provided, including a computer program. When the computer program or instructions are run on a computer, the method according to the first aspect or the second aspect is performed.

DETAILED DESCRIPTION OF THE EMBODIMENTS

The following describes technical terms in embodiments of this application.

1. Packet Attack

The packet attack means that an attacker disguises an attack packet and initiates access to an attacked device to attack the attacked device. As a result, data leakage occurs in the attacked device or even the device breaks down, causing great economic losses. A typical packet attack is a distributed denial of service (DDOS) attack, for example, a flooding DDOS attack (referred to as a flood attack below). The attacker uses a large quantity of bot hosts to send attack traffic to the attacked device together. Bandwidth, computing, or storage resources of the attacked device are exhausted by overwhelming resources. As a result, the attacked device breaks down and services are interrupted.

Figure 1:
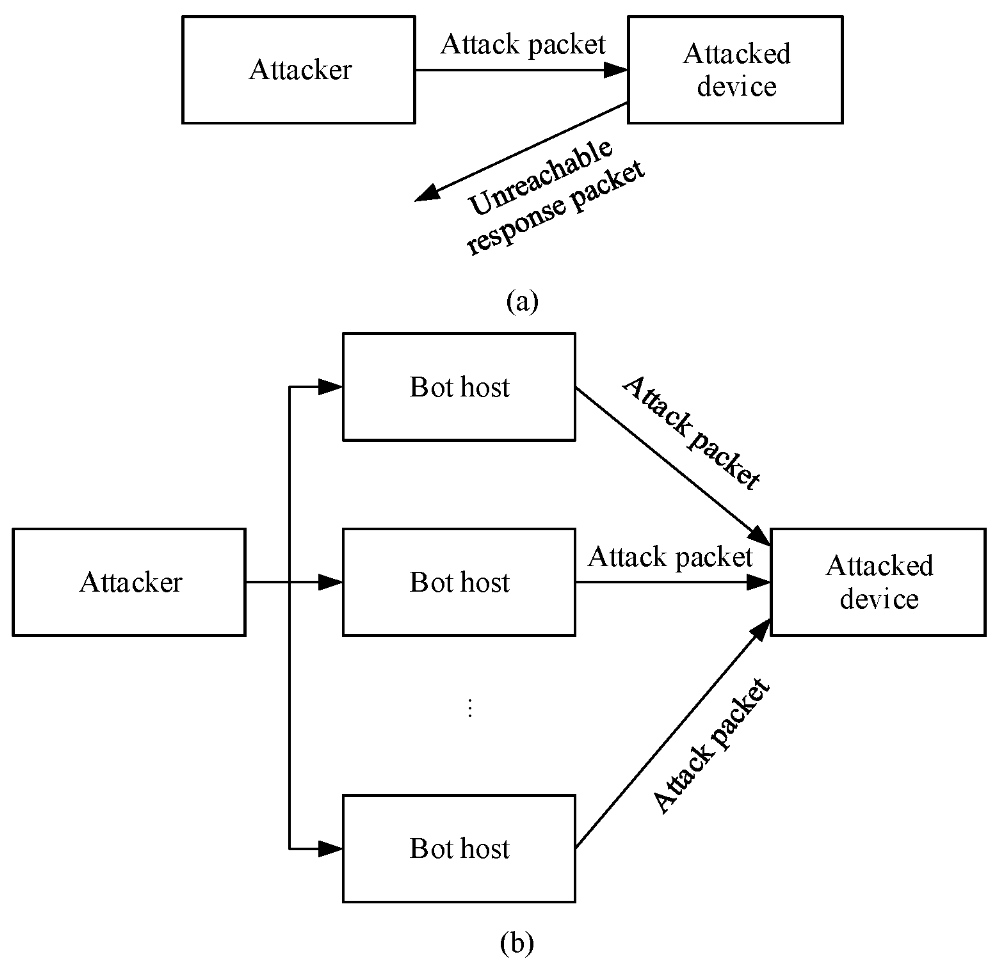
FIG. 1 is a schematic diagram of a scenario for a flood attack.

There are mainly two types of flood attacks, as shown in (a) and (b) in FIG. 1. Refer to (a) in FIG. 1. A flood attack (denoted as a flood attack 1) is that an attacker sends a large quantity of attack packets to an attacked device, and the attack packets carry false or unreachable internet protocol (IP) addresses. As a result, the attacked device needs to maintain a large quantity of half-open connections or respond to a large quantity of unreachable packets. As a result, resources for the attacked device are exhausted. Refer to (b) in FIG. 1. Another flood attack (denoted as a flood attack 2) is that an attacker sends a large quantity of packets to an attacked device through a large quantity of bot hosts. This directly causes resource exhaustion of the attacked device. Therefore, three solutions to the flood attacks are proposed currently: black hole, traffic cleaning, and interactive challenge-response verification that are separately described below.

2. Black Hole

Figure 2:
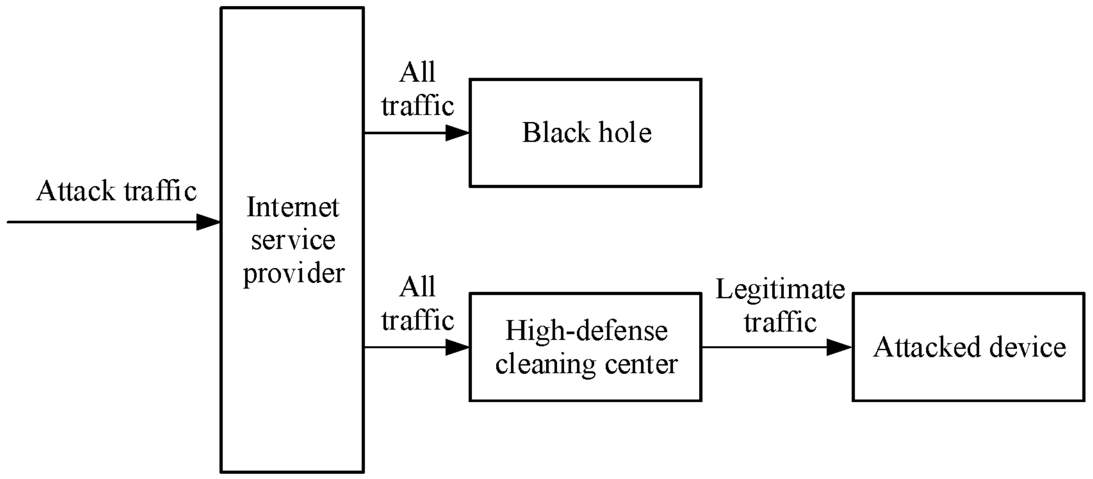
FIG. 2 is a schematic diagram of a scenario for a black-hole solution and a traffic cleaning solution.

Refer to FIG. 2. A blackhole solution means that when attack traffic of a flood attack reaches an attacked device, the attacked device may request an internet service provider (ISP) to which the attacked device belongs to direct all traffic destined for the attacked device to a black hole, that is, a device dedicated for receiving traffic, to ensure that the attacked device is not affected. For example, another device that is connected to the attacked device or that shares a same link with the attacked device is not affected.

3. Traffic Cleaning

Refer to FIG. 2. A traffic cleaning solution means that when the attack traffic of the flood attack reaches the attacked device, the attacked device may request the ISP to which the attacked device belongs to send all the traffic destined for the attacked device to a high-defense cleaning center. The high-defense cleaning center may be a device dedicated to identifying the flood attack. The high-defense cleaning center performs deep parsing on packets to identify attack features of the flood attack and identify legitimate traffic, namely, traffic including normal service packets, and illegitimate traffic, namely, traffic including abnormal service packets or attack packets. In this way, the high-defense cleaning center can return the legitimate traffic to the attacked device to ensure service continuity.

It should be noted that, for the flood attack 1 and the flood attack 2, both the blackhole solution and the traffic cleaning solution are applicable. However, in the blackhole solution, the traffic directed by the ISP to the black hole usually includes normal service traffic, such as a large quantity of normal service packets. The black hole only passively receives the traffic and does not return the normal service traffic to the attacked device. As a result, services are interrupted, and the service continuity cannot be ensured. In the traffic cleaning solution, it takes a long time for the high-defense cleaning center to perform deep parsing on the packets. As a result, the services are greatly delayed, and real-time performance of the services cannot be ensured.

4. Interactive Challenge-Response Verification

The interactive challenge-response verification is a solution to the flood attack 1. Whether a previously received packet is an attack packet of the flood attack 1 is determined by determining whether a response packet from a client is received.

Specifically, the client may send a packet 1 to a server. The packet 1 may be a synchronous idle character (SYN) packet or a packet in any other possible form. This is not limited. The server determines an SYN cookie. For example, the server may encrypt and calculate the SYN cookie based on a source IP address, a destination IP address, a source port, a destination port, and an SYN sequence number of the packet 1, so that the SYN cookie cannot be forged. Then, the server may send a packet 2 to the client. The packet 2 may be an acknowledgement (ACK) packet of the packet 1, and carries the SYN cookie. In this way, the client may determine an SYN cookie+1. For example, the client may extract the SYN cookie from the packet 2, to further determine the SYN cookie+1. Finally, the client may send a packet 3 to the server. The packet 3 may be an ACK packet of the packet 2, and carries the SYN cookie+1. For the server, the server may verify the packet 3, to determine, based on SYN cookie+1 in the packet 3, that the packet 3 is a normal service packet, to continue processing the service packet, so as to ensure real-time performance and continuity of a service. However, if the server determines that the packet 3 does not carry the SYN cookie+1, or does not receive the packet 3 within a timeout period, it indicates that the packet 1 is an attack packet from a forged IP address. The server may interrupt a half-open connection with the client, to avoid overheads caused by maintaining the half-open connection, and save resources of the server.

It can be learned that, in the interactive challenge-response verification solution, the server may encapsulate the SYN cookie in the packet by responding to each packet received by the server, to identify the flood attack 1 based on the SYN cookie. In addition, the server needs to respond to each received packet. In the case of the flood attack 2, due to this response manner, the resources of the server are quickly exhausted, and the server cannot defend against the flood attack.

Therefore, the black hole, the traffic cleaning, and the interactive challenge-response verification cannot be implemented to both defend against the packet attack and ensure the continuity and real-time performance of the service.

For the foregoing technical problem, the following technical solutions are provided in embodiments of this application. The technical solutions in embodiments of this application may be applied to various data networks, for example, a data center network, an enterprise or campus network, an edge computing network, and a cloud network.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, words such as "example" or "for example" are used to indicate an example, an instance, or descriptions. Any embodiment or design solution described as an "example" in this application should not be explained as being more preferred or having more advantages than another embodiment or design solution. Exactly, the term "example" is used to present a concept in a specific manner.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of a new service scenario, the technical solutions provided in embodiments of this application are also applicable to similar technical problems.

Figure 3:
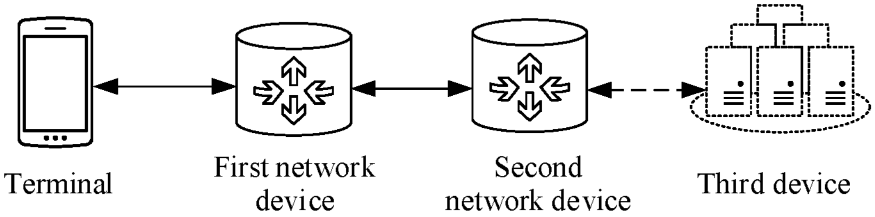
FIG. 3 is a schematic diagram of an architecture of a communication system according to an embodiment of this application.

For ease of understanding embodiments of this application, a communication system shown in FIG. 3 is first used as an example to describe in detail a communication system applicable to embodiments of this application. For example, FIG. 3 is a schematic diagram of an architecture of a communication system to which a communication method according to embodiments of this application is applicable.

As shown in FIG. 3, the communication system includes a terminal and a network device.

The terminal is a terminal that accesses the communication system and has a sending and receiving function, or a chip or a chip system that may be disposed in the terminal. The terminal may also be referred to as user equipment (UE), an access terminal, a subscriber unit, a subscriber station, a mobile station (MS), a mobile station, a remote station, a remote terminal, a mobile device, a user terminal, a terminal, a wireless communication device, a user agent, or a user device. A terminal in embodiments of this application may be a mobile phone, a cellular phone, a smartphone, a tablet computer (Pad), a wireless data card, a personal digital assistant (PDA), a wireless modem, a handset, a laptop computer, a machine type communication (MTC) terminal, a computer having a wireless sending and receiving function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a vehicle-mounted terminal, an RSU that has a terminal function, or the like. Alternatively, the terminal in this application may be a vehicle-mounted module, a vehicle-mounted subassembly, a vehicle-mounted component, a vehicle-mounted chip, or a vehicle-mounted unit that is built in a vehicle as one or more components or units. It should be noted that a corresponding client may be set on the terminal. Therefore, the client mentioned below may be understood as the terminal on which the client is located, and the client and the terminal may be replaced with each other.

There may be a plurality of network devices, for example, a first network device and a second network device, which are located on a network side of the communication system, and are devices with sending and receiving functions or chips or chip systems that may be disposed in the devices. The network device may include a physical device that supports a routing or switching function, for example, a forwarding device such as a router such as an access router (AR), a switch such as an access switch, an aggregation switch, a core switch, or a gateway, or may be a virtual device that supports route advertisement and packet forwarding, or may be a controller in a communication network, or may be a node or a server in a communication network, for example, a data server, a network server, a cloud server, or a server cluster including these servers, for example, a gNB in a new radio (NR) system, one or one group (including a plurality of antenna panels) of antenna panels of a base station in a 5G system, or may be a gNB, a transmission and reception point ((TRP) or a transmission point, TP), or a network node having a transmission measurement function (TMF), such as a baseband unit (BBU), a central unit (CU), a distributed unit (DU), a road side unit (RSU) having a base station function, or a wired access gateway. In addition, in systems using different radio access technologies, names of a network device may be different, for example, an NB (NodeB) in wideband code division multiple access (WCDMA) and an eNB or eNodeB (evolved NodeB) in long term evolution (LTE). The network device may alternatively be a radio controller in a cloud radio access network (CRAN) scenario. In addition, the network device may alternatively include an access point (AP) in a wireless fidelity (Wi-Fi) system, a wireless relay node, a wireless backhaul node, macro base stations in various forms, a micro base station (also referred to as a small cell), a relay station, an access point, a wearable device, a vehicle-mounted device, or the like.

Specifically, the first network device is used as an example. The first network device may be customer premises equipment (CPE), and an example of a device form of the first network device may be any one of the following: a forwarding device that supports a routing or switching function, such as a router, a switch, or a gateway, or a server, for example, a data server, a network server, a cloud server, or a server cluster including these servers. This is not limited in this application. There may be a plurality of first network devices, and the plurality of first network devices are interconnected to form a ring network, for example, a star ring network, a single ring network or a multi-ring network, a non-ring network, or a network topology in any other possible form. This is not limited in this application.

The second network device is used as an example. The second network device may be CPE, a cloud ingress device, or a cloud egress device. Similar to the first network device, an example of a device form of the second network device may be any one of the following: a forwarding device that supports a routing or switching function, such as a router, a switch, or a gateway, or a server, for example, a data server, a network server, a cloud server, or a server cluster including these servers. There may also be a plurality of second network devices, and the plurality of second network devices are interconnected to form a ring network, a non-ring network, or a network topology in any other possible form.

Optionally, the communication system may further include a third device. The third device may be a network device other than the first network device and the second network device in the communication system, or may be a terminal other than the terminal. In one aspect, a physical form of the first network device may be specifically a server, for example, a data server, a network server, a cloud server, or a server cluster including these servers. This is not limited in this application. For a functional form of the first network device, the third device may provide a security service, and may be a firewall. In addition, the third device may provide a cloud service, that is, the third device may be a cloud device, but this is not limited. The third device may also provide a conventional service, that is, a non-cloud service.

The terminal, the first network device, the second network device, and the third device may be applied to routing and forwarding scenarios, and perform the communication method provided in embodiments of this application, to implement inter-area, inter-region, or inter-network-layer packet attack defense in a forwarding scenario. The following describes in detail the communication method provided in embodiments of this application with reference to FIG. 4 to FIG. 9.

Figure 4:
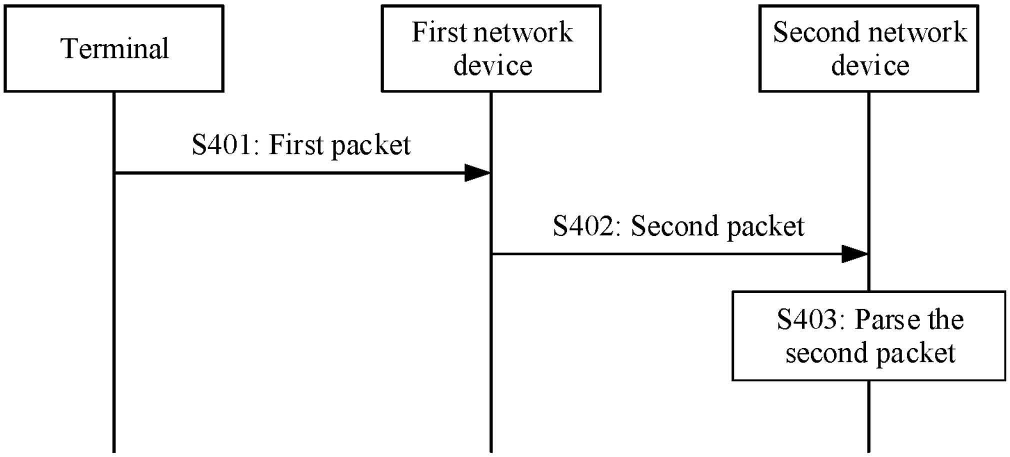
FIG. 4 is a schematic flowchart 1 of a communication method according to an embodiment of this application.

For example, FIG. 4 is a schematic flowchart 1 of the communication method according to an embodiment of this application. The communication method is applicable to communication between the terminal and the network devices, for example, the first network device and the second network device, in the communication system shown in FIG. 3. As shown in FIG. 4, the communication method includes the following steps.

S401: The terminal sends a first packet to the first network device. Correspondingly, the first network device receives the first packet from the terminal.

The first packet may be an internet protocol version 4 (IPv4) packet, or an internet protocol version 6 (IPv6) packet. Alternatively, the first packet may be a next-generation internet protocol packet. For example, the next-generation internet protocol packet may be referred to as an internet protocol version 6+(IPv6+) packet, an internet protocol version 9 (IPv9) packet, a new internet protocol version (New IP) packet, or any other possible naming form. This is not limited in this application.

A destination device corresponding to the first packet may be the third device, that is, the first packet needs to be sent to the third device, and may pass through the first network device and the second network device, that is, the third device is a downstream device of the first network device and the second network device. In this way, a destination address of the first network device may be an address of the third device, for example, a public address of the third device. The public address of the third device means that the address points to the third device but is unreachable to the third device, for example, may be a high-defense IP address prefix of the third device. In other words, a packet carrying the public address of the third device cannot be directly sent to the third device, but may be sent to a network device that is reachable to the third device, for example, the first network device or the second network device. After determining that the packet is not an attack packet, these network devices update a destination address of the packet to an internal reachable address of the third device, and then forward the packet to the third device, to prevent the third device from being directly attacked by the packet. The internal reachable address may be a true inner destination IP address (TrueInnerDstIP), and is available only to the third device. In other words, only the third device can identify the internal reachable address, and perform routing or packet consumption based on the internal reachable address. For a specific implementation, refer to the following S403, and related description in a second possible application scenario. Details are not described herein.

For the terminal, the terminal may obtain the public address of the third device from a domain name server (DNS), or the public address of the third device may be preconfigured locally. This is not limited. An example in which the public address of the third device is obtained from the DNS is used. In this case, a correspondence between a domain name of the third device and the public address of the third device is preconfigured in the DNS, for example, the correspondence is configured for the DNS by using a network control entity (NCE). The terminal may access the DNS based on the domain name of the third device, to obtain the public address of the third device, and encapsulate the public address of the third device in a to-be-sent packet, to obtain the first packet.

S402: The first network device sends a second packet to the second network device. Correspondingly, the second network device receives the second packet from the first network device.

The second packet is a packet obtained by encapsulating security information in the first packet. The security information indicates that the second packet is a trusted packet determined by the first network device. Alternatively, the security information indicates that the second packet is a trusted packet confirmed, guaranteed, verified, authenticated, or certified by the first network device. When the first packet is the IPV4 packet, the IPV6 packet, or the next-generation internet protocol packet, the obtained second packet is also an IPV4 packet, an IPV6 packet, or a next-generation internet protocol packet.

The security information may include first verification information. The first verification information may be authentication code (authcode), may be password protection information, and indicates that the second packet is the trusted packet determined by the first network device. This can prevent the security information from being forged or falsified, thereby improving a trustworthiness level of the security information. The first verification information may be determined by the first network device based on a verification algorithm, anti-replay information, and a first key. The verification algorithm may be, for example, a hash-based message authentication code (HMAC) algorithm, a cipher-based message authentication code (CMAC) algorithm, a message authentication code based on universal hashing (UMAC) algorithm, or a Galois message authentication code (GMAC) algorithm. The anti-replay information may be, for example, a non-repeated sequence (SEQ) number, a random number, or a timestamp. The first key may be a private key of the first network device, for example, a secret symmetric key, an asymmetric decryption key, or a quantum key.

Figure 5:
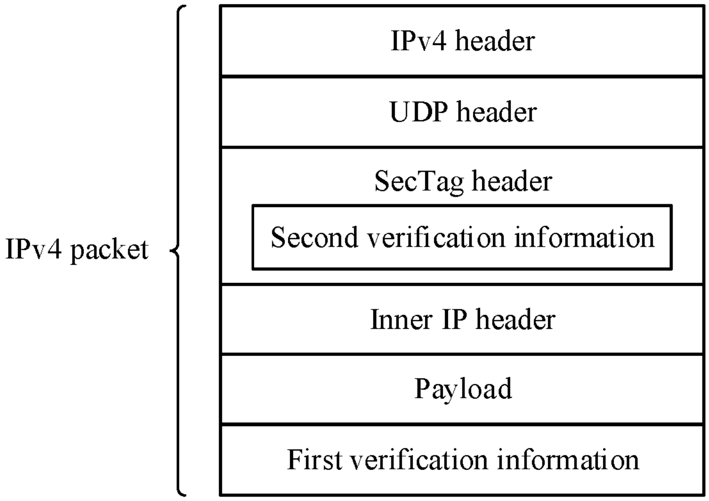
FIG. 5 is a schematic diagram 1 of a structure of an IPV4 packet in a communication method according to an embodiment of this application.
Figure 6:
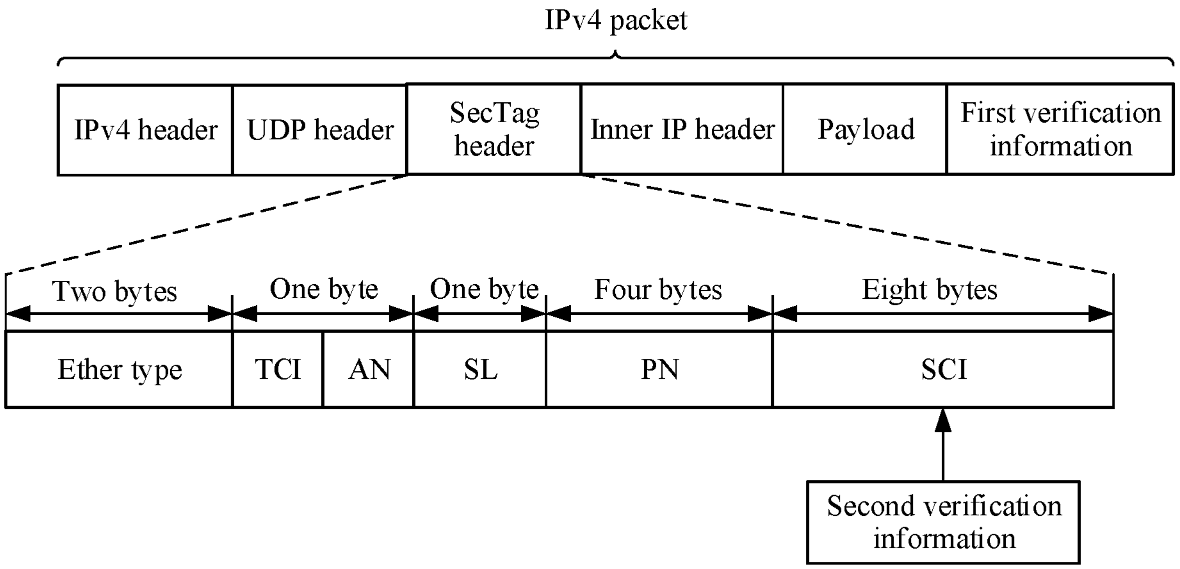
FIG. 6 is a schematic diagram 2 of a structure of an IPV4 packet in a communication method according to an embodiment of this application.

In a possible implementation, the first network device is preconfigured with a public address list. For a packet sent to a corresponding public address in the public address list, the first network device needs to add security information to the packet, to prove that the packet is a trusted packet determined by the first network device but not an attack packet. This ensures that the trusted packet can be received by a device corresponding to the public address. On this basis, after receiving the first packet, the first network device determines that the public address of the third device in the first packet is a public address in the public address list, to determine the first verification information based on the verification algorithm, the SEQ, and the first key, and encapsulates the first verification information in the first packet to obtain the second packet. Optionally, the first verification information is encapsulated in a header or a tail of the first packet to obtain the second packet. For example, as shown in FIG. 5, when the second packet is an IPV4 packet, the first verification information may be located at a tail of the IPV4 packet. Alternatively, as shown in FIG. 6, when the second packet is an IPV6 packet, the first verification information may be located at a tail of the IPV6 packet, for example, be encapsulated in an integrity check value (ICV) of the tail of the IPV6 packet. It should be noted that a length of the first verification information and a location of the first verification information in the second packet may be agreed upon by the first network device and the second network device in advance, or may be predefined in a protocol, so that the second network device can subsequently extract the first verification information from the second packet.

Optionally, the security information may further include second verification information, and the second verification information may include one or more of the following: an identifier of the first network device or a key ciphertext. The identifier of the first network device may be an authentication identifier of the subject (authenticated identifier, AID). If the second packet carries the identifier of the first network device, it indicates that the second packet is a trusted packet from a trusted device, for example, the first network device. There may be a plurality of first network devices, and each first network device may have a respective corresponding identifier. These identifiers may be the same or may be different, to distinguish the first network devices, such as a first network device 1 {AID1}, a first network device 2 {AID2}, and a first network device 3 {AID3}. In addition, the key ciphertext may be a descriptor of information of cryptographic key (KeyInfo), and the key ciphertext may be obtained through encryption based on a second key or may be an identifier of a second key to indicate the second key. The second key and the first key may be a same key, or may be different keys. For example, the first key and the second key have a derivation relationship. The second key may be obtained through calculation based on the first key, and is used by the second network device to verify the security information. It can be learned that, as a manner for implementing verification, the first network device does not directly send the second key to the second network device, but sends the key ciphertext that indicates the second key or is obtained through encryption based on the second key. This can improve communication security, prevent the second key from being stolen in a communication process, and ensure reliability of verification. For a specific implementation of verifying the security information by the second network device, refer to related description in the following S403. Details are not described herein.

Optionally, the second verification information may further include second indication information, and the second indication information indicates whether the security information includes one or more of the following: the identifier of the first network device or the key ciphertext. For example, the second indication information includes a plurality of bits (denoted as a bit string 1), and a value of each bit in the bit string 1 may indicate whether the security information includes a corresponding piece of information in the foregoing information, for example, the identifier of the first network device or the key ciphertext. It is assumed that the second indication information includes two bits, a value of the first bit indicates whether the security information includes the identifier of the first network device, and a value of the second bit indicates whether the security information includes the key ciphertext. Alternatively, a combination of values of the bit string 1 may indicate whether the security information includes one or more of the following: the identifier of the first network device or the key ciphertext. The foregoing assumption is continued. The second indication information includes two bits. If values of the two bits are 11, it indicates that the security information includes the identifier of the first network device and the key ciphertext. If values of the two bits are 00, it indicates that the security information does not include the identifier of the first network device and the key ciphertext. If values of the two bits are 10, it indicates that the security information includes only the identifier of the first network device. If values of the two bits are 01, it indicates that the security information includes only the key ciphertext. Alternatively, the second indication information further indicates a location and/or a length of one or more of the following in the second packet: the identifier of the first network device or the key ciphertext. For example, the second indication information further includes more bits (denoted as a bit string 2). The bits indicate the location and the length of the identifier of the first network device in the second packet, for example, a start location, an end location, and/or the length of the identifier of the first network device in the second packet, and/or indicate the location and/or the length of the key ciphertext in the second packet, for example, a start location, an end location, and/or the length of the key ciphertext in the second packet. The foregoing assumption is continued. The second indication information further includes six bits other than the two bits. In the six bits, a combination of values of three bits indicates the location and/or the length of the identifier of the first network device in the second packet. A combination of values of the other three bits indicates the location and/or the length of the key ciphertext in the second packet.

It should be noted that, in the foregoing implementation, the second indication information indicates, based on the bit string 1, whether the security information includes the identifier of the first network device and/or the key ciphertext, and indicates, based on the bit string 2, the location and/or the length of the identifier of the first network device and/or the key ciphertext in the second packet. In other implementations, for each piece of information of the identifier of the first network device and the key ciphertext, the second indication information may alternatively use a same bit to indicate whether the security information includes the piece of information and a location and/or a length of the piece of information in the second packet. For example, if these bits are a combination of specific values, it indicates that the security information does not include the piece of information. If these bits are a combination of other values, it indicates the location and/or the length of the piece of information in the second packet, that is, it implicitly indicates that the security information includes the piece of information. The foregoing assumption is continued. The second indication information includes eight bits. If a combination of specific values of the first four bits is, for example, 0000 or 1111, it indicates that the security information does not include the identifier of the first network device; or if a combination of other values of the first four bits is, for example, 1010, it indicates the location and/or the length of the identifier of the first network device in the second packet. Similarly, if a combination of specific values of the last four bits is, for example, 0000 or 1111, it indicates that the security information does not include the key ciphertext; or if a combination of other values of the last four bits is, for example, 0011, it indicates the location and/or the length of the key ciphertext in the second packet. In still some implementations, the second indication information may further indicate the location and/or the length of the first verification information in the second packet, for example, a start location, an end location, and/or the length of the first verification information in the second packet. A specific implementation is similar to that of the identifier of the first network device and/or the key ciphertext. Refer to the foregoing descriptions for understanding. Details are not described again. In another possible implementation, the length of the identifier of the first network device and/or the key ciphertext and the location of the identifier of the first network device and/or the key ciphertext in the second packet may be agreed upon by the first network device and the second network device in advance, or may be predefined in the protocol, so that the second network device can subsequently extract the identifier of the first network device and/or the key ciphertext from the second packet. In addition, if the second indication information indicates only the location of the foregoing information, the length of the information may be agreed upon by the first network device and the second network device in advance, or may be predefined in the protocol, for example, a fixed length. Similarly, if the second indication information indicates only the length of the foregoing information, the location of the information may be agreed upon by the first network device and the second network device in advance, or may be predefined in the protocol.

It may be understood that the second indication information is carried in the second verification information, so that the second network device can accurately extract one or more pieces of the foregoing information from the second packet based on the second indication information, for example, the first verification information, the identifier of the first network device, and the key ciphertext, to ensure accuracy and reliability of subsequent verification, and avoid a verification failure caused because the second network device fails to accurately extract the one or more pieces of the foregoing information. Because the second indication information can indicate the location and/or the length of the one or more pieces of the foregoing information in the second packet, the one or more pieces of the foregoing information can be encapsulated in the second packet more flexibly, so that the second packet is more flexible in structure and better in service compatibility, and is applicable to more service scenarios.

Similar to that the first verification information is in the header or the tail of the second packet, the second verification information may also be in the header or the tail of the second packet. In other words, the first network device may separately encapsulate the first verification information and the second verification information in the header or the tail of the first packet, to obtain the second packet. The second network device usually sequentially parses the second packet from the header to the tail of the second packet. On this basis, in an optional manner, the first verification information is encapsulated in the tail of the second packet, and the second verification information is encapsulated in the header of the second packet, so that the second network device can synchronously process the second verification information and parse the second packet. For example, when the second network device prepares for verification based on the second verification information, the second network device synchronously parses the tail of the second packet, and extracts the first verification information, to verify the second packet immediately. This avoids excessively long waiting time, and improves verification efficiency of the second network device.

Manner 11: As shown in FIG. 5 and FIG. 6, the second verification information is located between an IPv4 header and a payload of the IPV4 packet, for example, between a user datagram protocol (UDP) header after the IPV4 header and an inner IP header before the payload. Specifically, the second verification information may be encapsulated in a SecTag header of a media access control (MAC) security policy (SEC) between the UDP header and the payload. The SecTag header may include: an ether type cell, a tag control information (TCI) cell, an association number (AN) cell, a short length (SL) cell, a packet number (PN) cell, and a secure channel indicator (SCI) cell. A length of the ether type cell is two bytes. A length of the TCI cell is six bits, and a length of the AN cell is two bits. In this way, a sum of the lengths of the TCI cell and the AN cell is one byte. A length of the SL cell is one byte. A length of the PN cell is four bytes. A length of the SCI cell is eight bytes. The second verification information may be encapsulated in one or more of the foregoing cells, for example, the SCI cell, or any other possible cell, to implement cell multiplexing and reduce communication overheads. Certainly, that the second verification information is encapsulated in the SecTag header is merely an example, and is not limited. For example, the second verification information may be used as an independent cell and encapsulated between the SecTag header and the inner IP header. This is not limited in this application.

Figure 7:
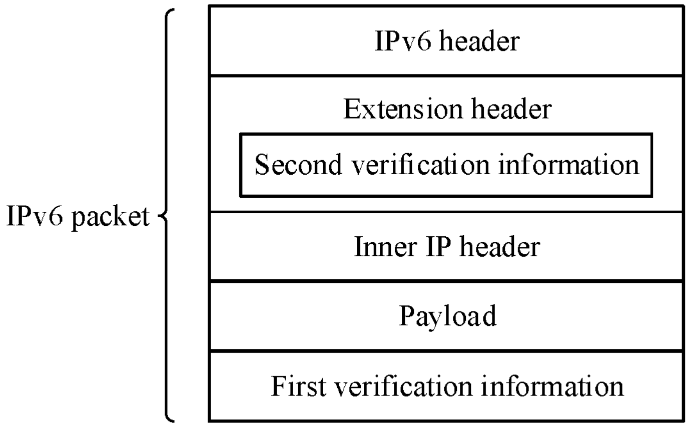
FIG. 7 is a schematic diagram of a structure of an IPV6 packet in a communication method according to an embodiment of this application.

Manner 12: As shown in FIG. 7, the second verification information may be located in an extension header of an IPV6 protocol header of an IPV6 packet. Specifically, the second verification information may be encapsulated in some cells of the extension header, for example, destination options or any other possible cell, and is identified by using a type-length-value (TLV), to implement cell multiplexing and reduce communication overheads. Certainly, the second verification information may alternatively be encapsulated in the extension header as an independent cell. This is not limited in this application.

With reference to Manner 11 and Manner 12, it can be learned that, the second verification information is encapsulated between the IPV4 header and the payload of the IPV4 packet or in the extension header of the IPV6 protocol header of the IPV6 packet. In this way, the second verification information is compatible with the current IPV4 or the IPv6 packet, the protocol change is less, and practical application is more convenient.

In this embodiment of this application, a destination address of the second packet is still the public address of the third device. In this way, the first network device may send the second packet to the second network device based on an egress port corresponding to the public address of the third device. Correspondingly, the second network device may receive the second packet through an ingress port connected to the first network device. Thus, the following S403 is continued to be performed.

S403: The second network device parses the second packet.

That the second network device parses the second packet means that the second network device decapsulates the second packet, and extracts the security information from the second packet.

Specifically, in an implementation, the security information includes the first verification information, and the second network device may be locally preconfigured with the corresponding verification algorithm, the anti-replay information, and the second key in a preconfigured manner or a protocol-predefined manner, or configured with third verification information determined based on the verification algorithm, the anti-replay information, and the second key is configured. In this way, after extracting the first verification information from the second packet based on a pre-agreed location and a pre-agreed length, or a protocol-predefined location and a protocol-predefined length, the second network device can further determine whether the first verification information is the same as the third verification information. Whether the first verification information is the same as the third verification information is compared, and it can be accurately identified whether the first verification information is falsified, whether the first verification information is forged information, and the like, thereby improving security and reliability of verification. For example, if the first verification information is the same as the third verification information, it indicates that the second packet is a legitimate packet, verification of the second packet succeeds, and the second network device may update the destination address of the second packet to the internal reachable address of the third device. For example, the second network device may traverse routing table entries, update the internal reachable address of the third device recorded in the routing table entries to the destination address of the second packet, to obtain a third packet, and send the third packet to the third device. If the first verification information is different from the third verification information, it indicates that the second packet may be an illegitimate packet, verification of the second packet fails, and the second network device may discard the second packet, or the second network device may still send the second packet to a high-defense cleaning center.

In another implementation, the security information includes the first verification information and the second verification information. The second network device may extract the first verification information, the key ciphertext, and/or the identifier of the first network device from the second packet based on a pre-agreed location and a pre-agreed length, or a protocol-predefined location and a protocol-predefined length. Alternatively, when the second verification information includes the second indication information, the second network device may further extract the first verification information, the key ciphertext, and/or the identifier of the first network device from the second packet based on the second indication information. In this way, the second network device can determine the second key based on the key ciphertext or the identifier of the first network device. Details are described below.

Manner 21: When the key ciphertext is obtained through encryption based on the second key, the second network device may be preconfigured with a corresponding third key, where the third key may decrypt the key ciphertext. For example, the key ciphertext is decrypted based on the third key and a corresponding decryption algorithm, to obtain the second key. The third key may be a private key of the second network device, for example, a secret symmetric key, an asymmetric decryption key, or a quantum key. When the key ciphertext is the identifier of the second key, the second network device is preconfigured with a correspondence between the identifier of the second key and the second key, to determine the second key based on the correspondence.

Manner 22: The second network device dynamically maintains an identifier list of the first network device locally. The identifier list records a correspondence between an identifier of each first network device and a key corresponding to the identifier, and the correspondence may be dynamically updated based on a configuration delivered by the NCE, for example, AID1 {key 1}, AID2 {key 2}, AID3 {key 3}, and AID4 {key 4}. The second network device may traverse the identifier list based on the identifier of the first network device carried in the second verification information, to determine a key corresponding to the identifier of the first network device, for example, the second key.

In this way, after determining the second key, the second network device can determine the third verification information based on the verification algorithm, the anti-replay information, and the second key, and determine whether the first verification information is the same as the third verification information. If the first verification information is the same as the third verification information, the second network device may update the destination address of the second packet to the internal reachable address of the third device, to obtain the third packet, and send the third packet to the third device. If the first verification information is different from the third verification information, the second network device may discard the second packet, or the second network device may still send the second packet to the high-defense cleaning center. Certainly, if the second network device determines that the received packet does not carry the first verification information, the second network device may also directly discard the packet, or send the packet to the high-defense cleaning center.

It can be learned that, the second key is not directly carried in the security information, but needs to be determined by the second network device based on the key ciphertext or the identifier of the first network device, or is directly configured locally on the second network device. In other words, the second key is a sufficiently secure key, and is difficult to forge or falsify. Therefore, when sufficient security of the second key is ensured, an attack packet usually can only falsify or forge other information, such as the verification algorithm and the anti-replay information. Therefore, once the information such as the verification algorithm and the anti-replay information is forged or falsified, the first verification information is different from the third verification information, and the verification fails. In this way, whether the second packet is a forged or falsified attack packet can be reliably and securely checked.

In conclusion, according to the method shown in FIG. 4, the security information is encapsulated in the first packet, so that the obtained second packet is the trusted packet determined by the first network device. In this way, the second network device can determine, based on the security information encapsulated in the second packet and without performing deep parsing on the second packet, whether the second packet is an attack packet. This can ensure continuity and real-time performance of a service while defending against packet attacks such as the flood attack 1 and the flood attack 2. In addition, that the method shown in FIG. 4 is applied to defending against the packet attack is merely an example. The method may be further applied to more scenarios, for example, security level-based restricted access and priority of quality of service-based restricted access.

Optionally, with reference to the foregoing embodiment, in a possible application scenario, that the second network device determines third verification information based on the second verification information may be specifically: The second network device determines whether the security information includes the identifier of the first network device, and determines the third verification information based on the second verification information if the second network device determines that the security information includes the identifier of the first network device. Conversely, if the second network device determines that the security information does not include the identifier of the first network device, the second network device may discard the second packet without performing the foregoing verification procedure.

It can be learned that if the second packet carries the identifier of the first network device, it indicates that the second packet is a trusted packet from a trusted device, for example, the first network device. If the second packet does not include the identifier of the first network device, it indicates that the second packet is an untrusted packet. In this case, the second network device may no longer verify the second packet, but send the second packet to the high-defense cleaning center. In this way, processing resources of the second network device can be saved, and operation efficiency of the second network device can be improved. In addition, the second packet is the untrusted packet, it does not indicate that the second packet is an attack packet, and the second packet may also be a regular data packet from the internet. Therefore, when it can be ensured that the second packet is the regular data packet after the second network device sends the second packet to the high-defense cleaning center, the second packet can still normally access the third device, to ensure reliability and stability of a service. However, if the verification still fails when the second packet carries the identifier of the first network device, it indicates that the second packet may be the falsified or forged attack packet, and the second network device may discard the second packet, and no longer send the second packet to the high-defense cleaning center, to save processing resources of the high-defense cleaning center.

It should be noted that, when the second network device determines that the second packet carries the identifier of the first network device and fails to pass the verification, that the second packet is discarded is merely an example, and is not intended as a limitation. In this case, the second network device may still send the second packet to the high-defense cleaning center.

Optionally, with reference to the foregoing embodiment, in a possible application scenario, the second verification information may further include one or more of the following: first indication information, an identifier of the second network device, the identifier of the verification algorithm, the anti-replay information, or the internal reachable address of the third device.

The first indication information may indicate a type of the security information, for example, indicate that the security information is information for defending against the flood attack 1 and/or the flood attack 2, for example, anti-DDOS information, or may further indicate a type of the second packet, for example, indicate that the second packet is a real and non-forged packet or a non-attack packet. In addition, because the security information in this embodiment of this application is not only used for defending against the flood attack 1 and/or the flood attack 2, but also may be further used for security level-based restricted access, quality of service priority-based restricted access, and the like, the first indication information may further indicate one or more of the following: a security level of the terminal, a trust degree of a packet sender, for example, a trust degree of the terminal or the first network device, a health degree of the second packet, or a quality of service priority. This is not limited in this application.

The identifier of the second network device indicates that the second packet needs to be processed by a corresponding second network device, and may be a security function executor match identifier (MatchID) of the second network device, or may be any other possible identifier. In an example, there may be a plurality of second network devices, and each second network device may have a corresponding identifier. The identifiers may be the same or may be different, to distinguish the second network devices. For example, it is assumed that the plurality of second network devices include a second network device 1, a second network device 2, and a second network device 3. Identifiers corresponding to the plurality of second network devices may be a second network device 1 {MatchID 1}, a second network device 2 {MatchID 2}, and a second network device 3 {MatchID 3}. For a second network device, after receiving the second packet, the second network device may determine whether an identifier of the second network device is the same as the identifier of the second network device carried in the second packet. If the identifier of the second network device is the same as the identifier of the second network device carried in the second packet, the second network device processes the second packet, that is, performs the verification procedure in S403. For details, refer to S403. Details are not described again. If the identifier of the second network device is different from the identifier of the second network device carried in the second packet, the second network device may forward the second packet to another second network device until the second packet is forwarded to a second network device with the same identifier as that of the second network device carried in the second packet. For example, the foregoing assumption is continued. The second packet carries the MatchID 3. After receiving the second packet, the second network device 1 determines that the MatchID 3 carried in the second packet is different from an identifier of the second network device 1, and forwards the second packet to the second network device 2 based on a routing table. After receiving the second packet, the second network device 2 also determines that the MatchID 3 carried in the second packet is different from an identifier of the second network device 2, to forward the second packet to the second network device 3 based on the routing table. In this way, the second network device 3 may determine that the MatchID 3 carried in the second packet is the same as an identifier of the second network device 3, to verify the second packet. It can be learned that, the identifier of the second network device may implement that the second packet is sent to a specified second network device for verification, that is, the first network device determines in advance that different traffic is verified by different second network devices, to avoid sending a large amount of traffic to a same second network device for verification, so as to balance load of a plurality of second network devices. Certainly, that the identifier of the second network device is used to implement load balancing is merely an example, and is not limited. For example, a specified link between the first network device and the second network device may alternatively be configured to implement load balancing.

The identifier of the verification algorithm indicates that the second packet needs to be verified by using a corresponding verification algorithm, and may be a cipher suite identifier (CipherSuitID) of the verification algorithm. The second network device is locally configured with a plurality of verification algorithms, and is further configured with a correspondence between each verification algorithm and the identifier of the verification algorithm. In this way, the second network device may determine, from a plurality of verification algorithms based on the identifier of the verification algorithm in the security information and the correspondence, a verification algorithm required for generating the second key, to avoid a failure of verification on the security information caused by an incorrect key generated by using an incorrect verification algorithm, so as to improve reliability of the verification.

The anti-replay information may be used by the second network device to generate the third key, and may be further used to prevent a replay attack. For example, the second network device may determine, based on the anti-replay information, whether the second packet is a replayed packet or a new packet. The internal reachable address of the third device may be used by the second network device to generate the third packet. For a specific implementation, refer to the related description in S403. Details are not described herein again.

Figure 8:
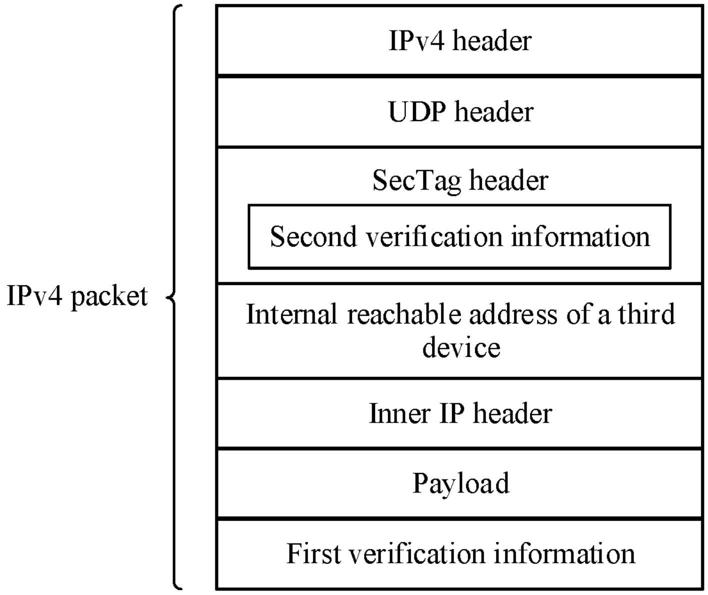
FIG. 8 is a schematic diagram 3 of a structure of an IPV4 packet in a communication method according to an embodiment of this application.
Figure 9:
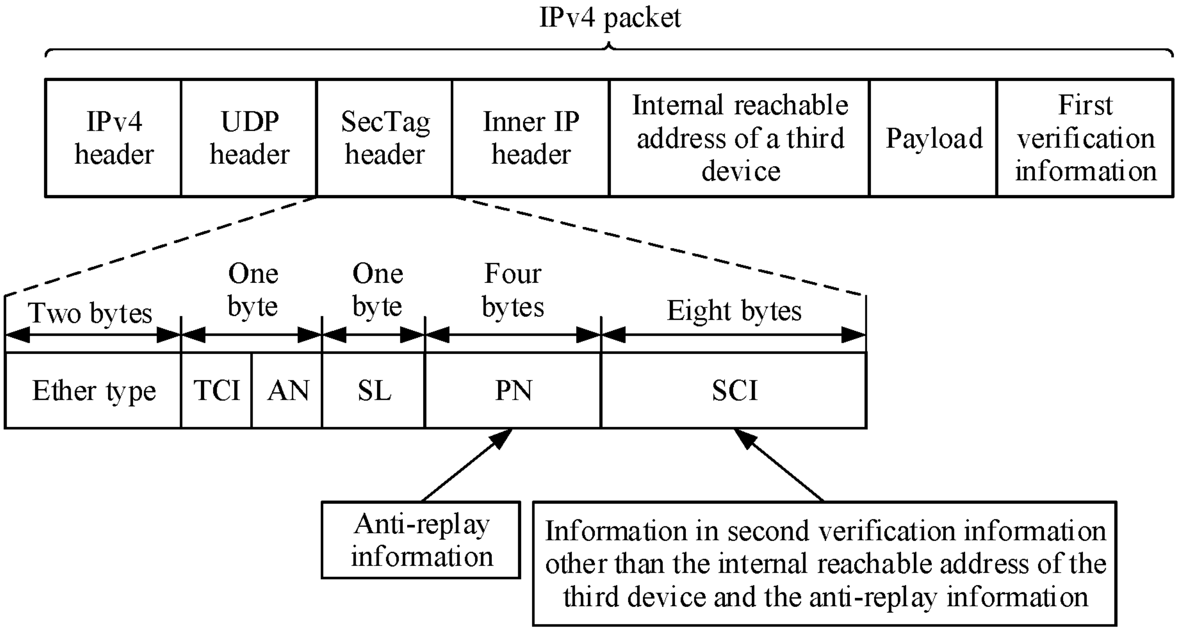
FIG. 9 is a schematic diagram 4 of a structure of an IPV4 packet in a communication method according to an embodiment of this application.

When the second verification information includes the one or more pieces of the following information: the first indication information, the identifier of the second network device, the identifier of the verification algorithm, the anti-replay information, or the internal reachable address of the third device, if the second packet is an IPV4 packet, the information included in the second verification information may be carried in a same cell or different cells, or carried in an IPV4 packet as an independent cell. For example, as shown in FIG. 8 and FIG. 9, the internal reachable address of the third device is used as an independent cell, and is carried between a SecTag header and an inner IP header, or may be carried in any other possible location. The anti-replay information may be carried in a PN cell in the SecTag header, or may be carried in any other possible cell. Information in the second verification information other than the internal reachable address of the third device and the anti-replay information may be carried in an SCI cell in the SecTag header, or may be carried in any other possible cell. Alternatively, if the second packet is an IPV6 packet, the information included in the second verification information may be carried in a same cell or different cells, or carried in the IPV6 packet as an independent cell. For a specific implementation, refer to the related description of the foregoing IPv6 packet. Details are not described herein again.

On this basis, the second indication information may further indicate whether the security information includes one or more pieces of the following information of the second verification information: the first indication information, the identifier of the second network device, the identifier of the verification algorithm, the anti-replay information, or the internal reachable address of the third device. In addition, the second indication information may further indicate locations and/or lengths of the information in the second packet. For a specific implementation, refer to the related descriptions in 402. Details are not described herein again. Certainly, if the second indication information does not indicate whether the security information includes the information, whether the security information includes the information may be agreed upon by the first network device and the second network device in advance, or may be predefined in a protocol. Similarly, if the second indication information does not indicate the locations and/or lengths of the information in the second packet, the locations and lengths of the information in the second packet may be agreed upon by the first network device and the second network device in advance, or may be predefined in a protocol.

It can be learned that the one or more pieces of the foregoing information, for example, information such as the anti-replay information or the internal reachable address of the third device, carried in the second verification information is mainly used for verification and forwarding by the second network device. In other words, the second network device can use the information to verify the security information, and forward the third packet by using the information. In this case, the information is carried in the packet, so that the second network device does not need to dynamically maintain the information locally, thereby saving processing resources of the second network device, and improving resource utilization and operating efficiency of the second network device.

In addition, that the second verification information includes one or more pieces of the foregoing information is merely an example, and is not limited. The second verification information may further include any other possible information, for example, further include one or more pieces of the following information: an identifier of a first domain and an identifier of the terminal. The first domain may be a network area managed by the first network device or any other possible network device.

Optionally, with reference to the foregoing embodiment, in a possible application scenario, the first network device may further receive first configuration information from a network controller. The first configuration information may be carried in one or more of the following messages: a hypertext transfer protocol secure (HTTPS) message, a network configuration protocol (NETCONF) message, a representational state transfer configuration protocol (RESTCONF) message, or a representational state transfer (restful) message. The first configuration information may include one or more of the following: the public address of the third device, the first verification information, the verification algorithm, the identifier of the verification algorithm, a first key, the anti-replay information, the identifier of the first network device, the key ciphertext, the identifier of the second network device, the internal reachable address of the third device, the first indication information, or the second indication information.

In a possible design, when the first configuration information includes the first verification information, the network controller may directly configure the first verification information for the first network device, and the first network device does not need to determine the first verification information by the first network device. In this case, the first configuration information may not include related information used by the first network device to determine the first verification information, for example, information such as the first key, the anti-replay information, the verification algorithm, and the identifier of the verification algorithm, to save resources and reduce communication overheads. Certainly, when the first configuration information includes the first verification information, that the first configuration information does not include the related information is merely an example. Alternatively, the first configuration information may include the related information. This is not limited in this application. In another possible design, when the first configuration information does not include the first verification information, the first configuration information may include the related information, so that the first network device can determine the first verification information by the first network device based on the related information. In another possible design, when one or more pieces of the following information need to be carried in a packet: the first indication information, the identifier of the second network device, the identifier of the verification algorithm, the anti-replay information, or the internal reachable address of the third device, for example, be carried in the second verification information of the second packet, the first configuration information may include the information. However, when the information does not need to be carried in a packet, the first configuration information may or may not include the information. This is not limited in this application. In still another possible design, when the verification algorithm is locally preconfigured for the first network device, the first configuration information may not include the verification algorithm, but includes the identifier of the verification algorithm, to indicate, based on the identifier of the verification algorithm, the first network device to use the verification algorithm corresponding to the identifier of the verification algorithm. Alternatively, in this case, the first configuration information may still include the verification algorithm. This is not limited in this application. In addition, when no verification algorithm is locally preconfigured for the first network device, the first configuration information may include the verification algorithm, but does not include the identifier of the verification algorithm, to directly indicate, based on the verification algorithm, that the first network device needs to use the verification algorithm. Alternatively, in this case, the first configuration information may still include the identifier of the verification algorithm. This is not limited in this application.

It can be learned that the network controller configures the first configuration information for the first network device, so that the first network device can encapsulate the security information in the first packet based on the first configuration information, to obtain the second packet. In this way, the second network device can determine, based on the security information encapsulated in the second packet and without performing deep parsing on the second packet, whether the second packet is an attack packet. This can ensure continuity and real-time performance of a service while defending against a packet attack.

Optionally, with reference to the foregoing embodiment, in a possible application scenario, the second network device may further receive second configuration information from the network controller. The second configuration information may be carried in one or more of the following messages: an HTTPS message, a NETCONF message, a RESTCONF message, or a restful message. The second configuration information includes one or more of the following: the internal reachable address of the third device, the identifier of the second network device, the identifier of the first network device, or the third key, where the third key is used to decrypt the key ciphertext to obtain the second key.

In a possible design, when the internal reachable address of the third device and/or the identifier of the second network device are/is carried in a packet, for example, is carried in the second verification information of the second packet, the second configuration information may not include the internal reachable address of the third device and/or the identifier of the second network device, to reduce communication overheads, reduce an information maintenance amount of the second network device, and improve operating efficiency of the second network device. Alternatively, when the internal reachable address of the third device and/or the identifier of the second network device are/is carried in a packet, the second configuration information may still include the internal reachable address of the third device and/or the identifier of the second network device. This is not limited in this application. In another possible design, if the second network device needs to obtain the second key in the manner 21, the second configuration information includes the third key, and may not include the identifier of the first network device, to reduce communication overheads and improve communication efficiency. Alternatively, when the second network device needs to obtain the second key in the manner 21, the second configuration information may still include the identifier of the first network device. This is not limited in this application. If the second network device needs to obtain the second key in the manner 22, the second configuration information includes the identifier of the first network device, and may not include the third key, to reduce communication overheads and improve communication efficiency. Alternatively, when the second network device needs to obtain the second key in the manner 22, the second configuration information may still include the third key. This is not limited in this application.

It can be learned that the network controller configures the second configuration information for the second network device, so that the second network device can verify the second packet based on the second configuration information, to determine whether the second packet is an attack packet, and does not need to perform deep parsing on the second packet. This can ensure continuity and real-time performance of a service while defending against a packet attack.

Figure 10:
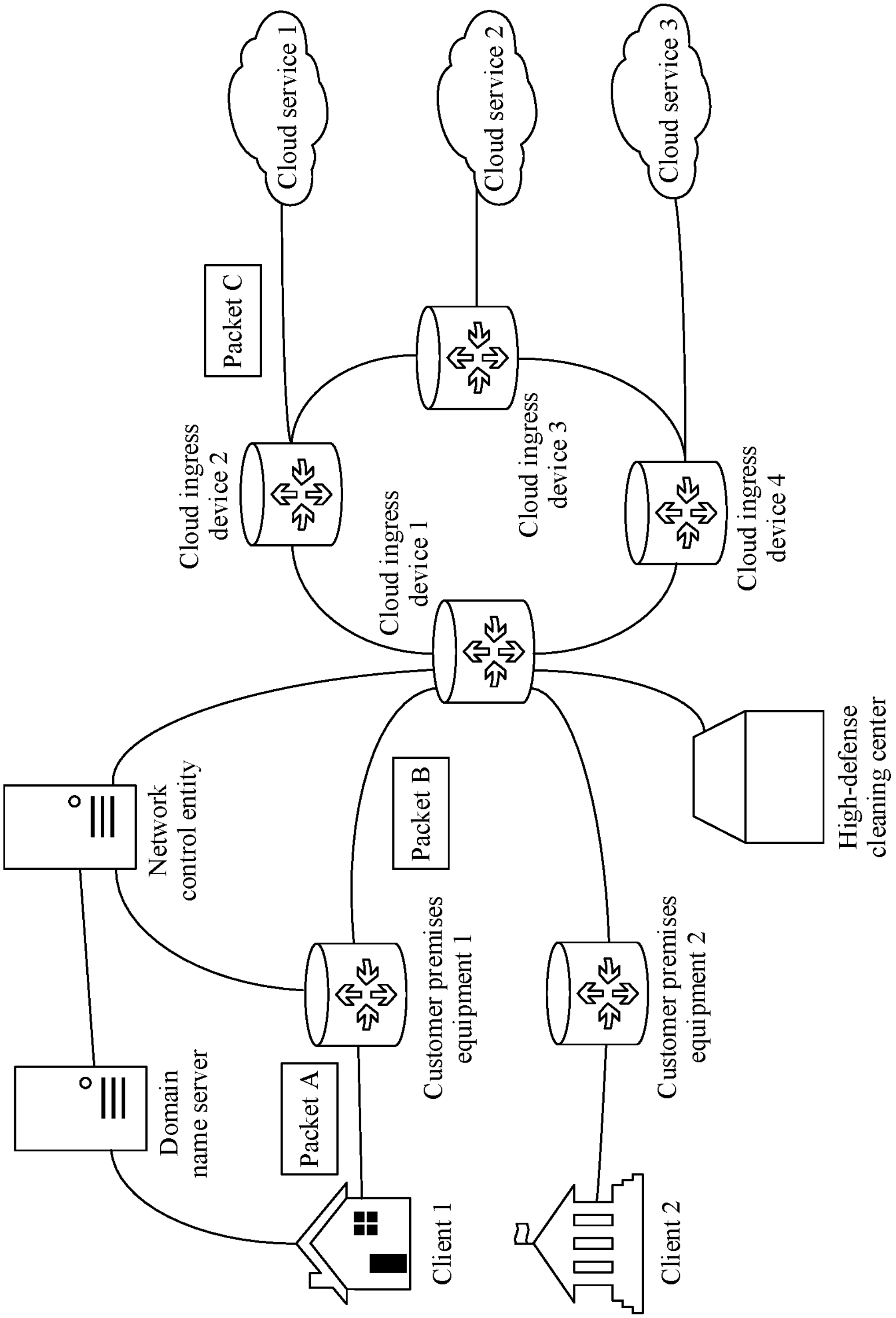
FIG. 10 is a schematic diagram of an application scenario of a communication method according to an embodiment of this application.

The foregoing describes an overall procedure of the communication method provided in this embodiment of this application with reference to FIG. 4. The following describes in detail a procedure of the communication method shown in FIG. 4 in a specific application scenario with reference to FIG. 10. The application scenario shown in FIG. 10 includes: an NCE, a DNS, a high-defense cleaning center, clients (such as a client 1 and a client 2), CPE (such as CPE 1 and CEP 2), cloud ingress devices (such as a cloud ingress device 1, a cloud ingress device 2, a cloud ingress device 3, and a cloud ingress device 4), and cloud services (such as a cloud service 1, a cloud service 2, and a cloud service 3). The foregoing terminal may be a client, the foregoing first network device may be CPE, the foregoing second network device may be a cloud ingress device, and the foregoing third device is a cloud service. For ease of understanding, the following uses the client 1, the CEP 1, the cloud ingress device 1, and the cloud service 1 as an example for description.

The NCE may deliver a correspondence between a public address of the cloud service 1 and a domain name of the cloud service 1 to the DNS. The NCE may deliver corresponding first configuration information to the CPE 1, where the first configuration information may include one or more of the public address of the cloud service 1, an internal reachable address of the cloud service 1, first verification information, a verification algorithm, an identifier of the verification algorithm, anti-replay information, a first key, a key ciphertext, an identifier of the CPE 1, an identifier of the cloud ingress device 1, first indication information, and second indication information. The NCE may deliver corresponding second configuration information to the cloud ingress device 1, where the second configuration information may include the internal reachable address of the cloud service 1, the identifier of the cloud ingress device 1, the identifier of the CPE 1, and a third key.

The client 1 may access the DNS based on the domain name of the cloud service 1, to obtain the public address of the cloud service 1. The client 1 may encapsulate the public address of the cloud service 1 in a destination address of a to-be-sent packet, to obtain a packet A. The client 1 may traverse a local routing table and send the packet A to the CPE 1.

The CPE 1 determines that a destination address of the packet A is the same as a locally configured address, that is, both are the public address of the cloud service 1, and encapsulates security information in the packet A to obtain a packet B. The security information may include the first verification information and second verification information. The second verification information may include the identifier of the verification algorithm, the anti-replay information, the key ciphertext, the first indication information, the second indication information, the identifier of the CPE 1, the identifier of the cloud ingress device 1, and the internal reachable address of the cloud service 1. The CPE 1 may traverse a local routing table, and send the packet B to the cloud ingress device 1.

The cloud ingress device 1 extracts the security information from the packet B, and determines that an identifier of the cloud ingress device in the security information is the same as a locally configured identifier, that is, both are the identifier of the cloud ingress device 1. If the cloud ingress device 1 determines that the identifier of the cloud ingress device in the security information is different from the locally configured identifier, for example, the security information includes an identifier of the cloud ingress device 2, the cloud ingress device 1 forwards the packet B to the cloud ingress device 2. The cloud ingress device 1 is still used as an example. The cloud ingress device 1 further determines that the identifier in the security information is the same as the locally configured identifier, that is, both are the identifier of the CPE 1. Then, the cloud ingress device 1 decrypts the key ciphertext in the security information by using the locally configured third key, to obtain a second key. The cloud ingress device 1 encrypts the anti-replay information in the security information and the second key by using the verification algorithm corresponding to the identifier of the verification algorithm in the security information, to obtain third verification information. Finally, the cloud ingress device 1 determines that the third verification information is the same as the first verification information in the security information, to strip the security information from the packet B, updates a destination address in the packet B to the internal reachable address of the cloud service 1 in the security information, to obtain a packet C, and sends the packet C to the cloud service 1.

It should be noted that, for a data packet that comes from an internet and directly accesses the cloud service 1, the data packet is usually not encapsulated with security information, and does not carry an identifier. In this case, the cloud ingress device 1 cannot determine whether the data packet is a normal packet or an attack packet, and therefore may forward the data packet to the high-defense cleaning center. If the high-defense cleaning center determines that the data packet is the attack packet through deep parsing, it discards the data packet. If the high-defense cleaning center determines that the data packet is the normal packet through deep parsing, the high-defense cleaning center forwards the data packet to the cloud ingress device 1, so that the cloud ingress device 1 updates a destination address in the data packet to the internal reachable address of the cloud service 1, and then sends the data packet to the cloud service 1, to ensure that when the data packet is the normal packet, the data packet can still be finally sent to the cloud service 1. However, if some attack packets forge or falsify the security information in the foregoing packet, for example, forge or falsify the foregoing key ciphertext and anti-replay information, the cloud ingress device 1 may determine, through verification, that an identifier in the security information is different from a locally configured identifier, or determine that the third verification information is different from the first verification information in the security information, and determines that the packet is an attack packet, to discard the packet.

The foregoing describes in detail the communication method provided in embodiments of this application with reference to FIG. 4 to FIG. 10. The following describes in detail a communication apparatus configured to perform the communication method provided in embodiments of this application with reference to FIG. 11 to FIG. 13.

Figure 11:
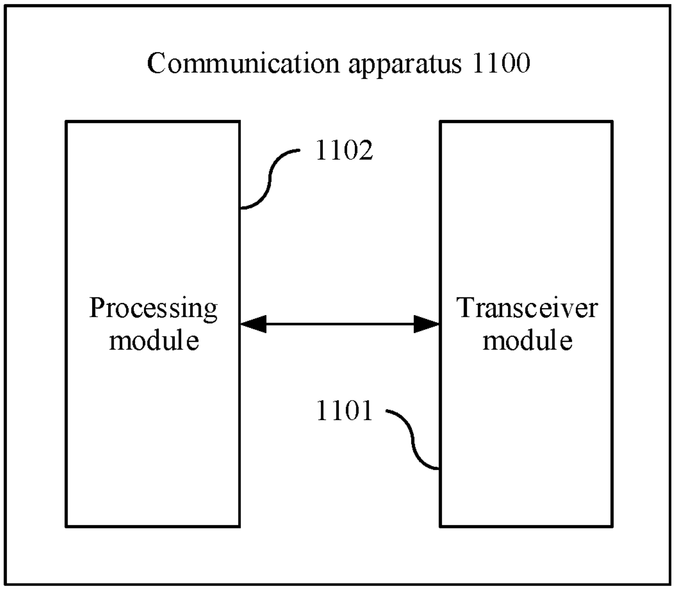
FIG. 11 is a schematic diagram 1 of a structure of a communication apparatus according to an embodiment of this application.

For example, FIG. 11 is a schematic diagram 1 of a structure of the communication apparatus according to an embodiment of this application. The communication apparatus 1100 may include a corresponding module or unit for performing the foregoing method/operation/step/action. The module or unit may be a hardware circuit or software, or may be implemented by a hardware circuit in combination with software. For example, as shown in FIG. 11, the communication apparatus 1100 includes a transceiver module 1101 and a processing module 1102. For ease of description, FIG. 11 shows only main components of the communication apparatus.

In some embodiments, the communication apparatus 1100 is applicable to the communication system shown in FIG. 3, and implements a function of the first network device in the method shown in FIG. 4.

The transceiver module 1101 is configured to receive a first packet from a terminal. The processing module 1102 is configured to obtain a second packet. The transceiver module 1101 is configured to send the second packet to a second network device. The second packet is a packet obtained by encapsulating security information in the first packet. The security information indicates that the second packet is a trusted packet determined by the communication apparatus.

In a possible design solution, the security information may include first verification information, and the first verification information indicates that the second packet is the trusted packet determined by the communication apparatus 1100.

Optionally, the security information may further include second verification information, and the second verification information may include one or more of the following: an identifier of a verification algorithm, anti-replay information, an identifier of the communication apparatus 1100, a key ciphertext, an identifier of the second network device, an internal reachable address of a third device, or first indication information. The third device is a downstream device of the second network device, and the first indication information indicates a type of the security information.

Optionally, the second verification information may further include second indication information, and the second indication information indicates whether the security information includes one or more of the following: the identifier of the verification algorithm, the anti-replay information, the identifier of the communication apparatus 1100, or the key ciphertext.

Optionally, the second verification information may further include the second indication information, and the second indication information indicates a location and/or a length of one or more of the following in the second packet: the first verification information, the identifier of the verification algorithm, the anti-replay information, the identifier of the communication apparatus 1100, or the key ciphertext.

Optionally, the first verification information may be in a header or a tail of the second packet, and the second verification information may be in the header or the tail of the second packet.

Optionally, the second packet is an internet protocol version 4 IPV4 packet or an internet protocol version 6 IPv6 packet. The second verification information is located between an IPV4 header and a payload of the IPV4 packet when the second packet is the IPV4 packet, or the second verification information is located in an extension header of an IPV6 protocol header of the IPV6 packet when the second packet is the IPV6 packet.

Optionally, the transceiver module 1101 is further configured to: before sending the second packet to the second network device, receive first configuration information from a network controller. The first configuration information may include one or more of the following: a public address of the third device, the first verification information, the verification algorithm, the identifier of the verification algorithm, the anti-replay information, a first key, the anti-replay information, the identifier of the communication apparatus 1100, the key ciphertext, the identifier of the second network device, the internal reachable address of the third device, the first indication information, or the second indication information. The verification algorithm, the anti-replay information, and the first key are used to determine the first verification information.

Optionally, destination addresses of the first packet and the second packet are the public address of the third device.

In a possible design solution, the communication apparatus 1100 is any one of the following: a router, a gateway, or a switch, and the second network device is a router.

Optionally, the transceiver module 1101 may alternatively include a sending module and a receiving module (not shown in FIG. 11). The sending module is configured to implement a sending function of the communication apparatus 1100, and the receiving module is configured to implement a receiving function of the communication apparatus 1100.

Optionally, the communication apparatus 1100 may further include a storage module (not shown in FIG. 11). The storage module stores a program or instructions. When the processing module executes the program or the instructions, the communication apparatus 1100 can implement the function of the first network device in the method shown in FIG. 4.

It should be understood that the processing module in the communication apparatus 1100 may be implemented by a processor or a processor-related circuit component, and may be a processor or a processing unit. The transceiver module may be implemented by a transceiver or a transceiver-related circuit component, and may be a transceiver or a transceiver unit.

It should be noted that the communication apparatus 1100 may be used in the foregoing first network device. The communication apparatus 1100 may be a router, a gateway, or a switch, may be an apparatus in a router, a gateway, or a switch (for example, a chip, a chip system, or a circuit), or may be an apparatus that can be used in a manner of being matched with a router, a gateway, or a switch.

In addition, for a technical effect of the communication apparatus 1100, refer to the corresponding technical effect in the method shown in FIG. 4. Details are not described herein again.

In some other embodiments, the communication apparatus 1100 is applicable to the communication system shown in FIG. 3, and implement a function of the second network device in the method shown in FIG. 4.

The transceiver module 1101 is configured to receive a second packet from a first network device. The processing module 1102 is configured to verify the second packet. Security information is encapsulated in the second packet, and the security information indicates that the second packet is a trusted packet determined by the first network device.

In a possible design solution, the security information may include first verification information, and the first verification information indicates that the second packet is the trusted packet determined by the first network device.

Optionally, the security information may further include second verification information, and the second verification information may include one or more of the following: an identifier of a verification algorithm, anti-replay information, an identifier of the first network device, a key ciphertext, an identifier of the communication apparatus 1100, an internal reachable address of a third device, or first indication information. The first indication information indicates a type of the security information.

Optionally, the second verification information may further include second indication information, and the second indication information indicates whether the security information includes one or more of the following: the identifier of the verification algorithm, the anti-replay information, the identifier of the first network device, or the key ciphertext.

Optionally, the second verification information may further include the second indication information, and the second indication information indicates a location and/or a length of one or more of the following in the second packet: the first verification information, the identifier of the verification algorithm, the anti-replay information, the identifier of the first network device, or the key ciphertext.

Optionally, the first verification information is in a header or a tail of the second packet, and the second verification information is in the header or the tail of the second packet.

Optionally, the second packet is an internet protocol version 4 IPv4 packet or an internet protocol version 6 IPv6 packet. The second verification information is located between an IPV4 header and a payload of the IPV4 packet when the second packet is the IPV4 packet, or the second verification information is located in an extension header of an IPV6 protocol header of the IPV6 packet when the second packet is the IPV6 packet.

Optionally, the processing module 1102 is further configured to: determine third verification information based on the second verification information, to verify the second packet based on the first verification information and the third verification information.

Further, if the first verification information is the same as the third verification information, the processing module 1102 is further configured to: update a destination address of the second packet to the internal reachable address of the third device, to obtain a third packet, and control the transceiver module 1101 to send the third packet to the third device. Alternatively, if the first verification information is different from the third verification information, the processing module 1102 is further configured to discard the second packet.

Further, the processing module 1102 is further configured to: determine a second key based on the key ciphertext or the identifier of the first network device, to determine the third verification information based on the verification algorithm, the anti-replay information, and the second key.

Optionally, the processing module 1102 is further configured to: before determining the third verification information based on the second verification information, determine that the security information includes the identifier of the first network device. Alternatively, the processing module 1102 is further configured to: determine that the security information does not include the identifier of the first network device, and the processing module 1102 discards the second packet, or controls the transceiver module 1101 to send the second packet to a high-defense cleaning center.

In a possible design solution, the transceiver module 1101 is further configured to: before the processing module 1102 verifies the second packet, receive second configuration information from a network controller. The second configuration information includes one or more of the following: the internal reachable address of the third device, the identifier of the communication apparatus 1100, the identifier of the first network device, or a third key. The third key is used to decrypt the key ciphertext to obtain the second key.

In a possible design solution, the first network device is any one of the following: a router, a gateway, or a switch, and the communication apparatus 1100 is a router.

Optionally, the transceiver module 1101 may alternatively include a sending module and a receiving module (not shown in FIG. 11). The sending module is configured to implement a sending function of the communication apparatus 1100, and the receiving module is configured to implement a receiving function of the communication apparatus 1100.

Optionally, the communication apparatus 1100 may further include a storage module (not shown in FIG. 11). The storage module stores a program or instructions. When the processing module executes the program or the instructions, the communication apparatus 1100 can implement the function of the second network device in the method shown in FIG. 4.

It should be understood that the processing module in the communication apparatus 1100 may be implemented by a processor or a processor-related circuit component, and may be a processor or a processing unit. The transceiver module may be implemented by a transceiver or a transceiver-related circuit component, and may be a transceiver or a transceiver unit.

It should be noted that the communication apparatus 1100 may be used in the foregoing second network device. The communication apparatus 1100 may be a router, may be an apparatus in a router (for example, a chip, a chip system, or a circuit), or may be an apparatus that can be used in a manner of being matched with a router.

In addition, for a technical effect of the communication apparatus 1100, refer to the corresponding technical effect in the method shown in FIG. 4. Details are not described herein again.

Figure 12:
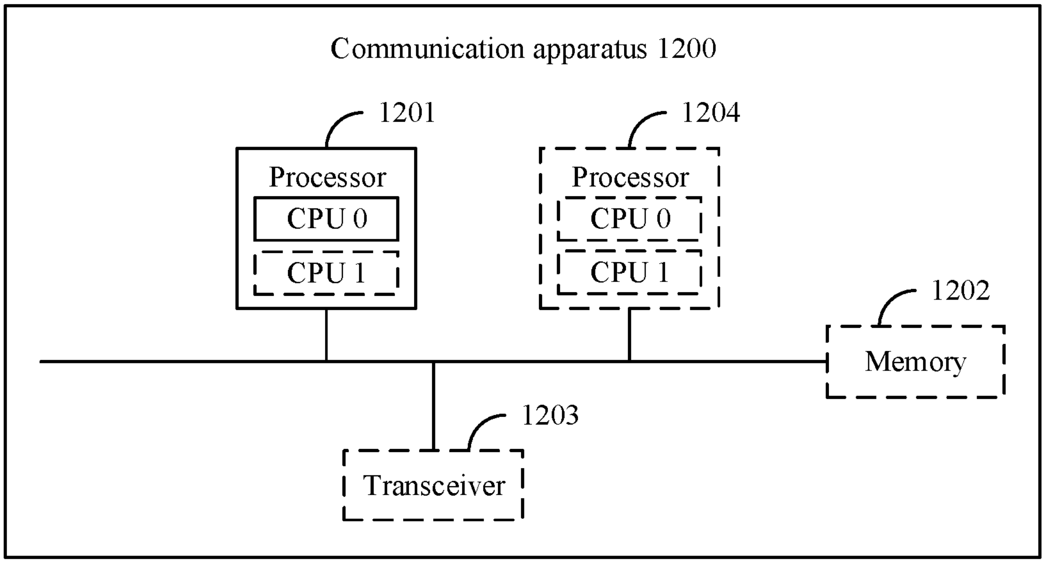
FIG. 12 is a schematic diagram 2 of a structure of a communication apparatus according to an embodiment of this application.

For example, FIG. 12 is a schematic diagram 3 of a structure of the communication apparatus according to an embodiment of this application. The communication apparatus may be a terminal device or a network device, or may be a chip (system) or another component or subassembly that may be disposed in a terminal device or a network device. As shown in FIG. 12, the communication apparatus 1200 may include a processor 1201. Optionally, the communication apparatus 1200 may further include a memory 1202 and/or a transceiver 1203. The processor 1201 is coupled to the memory 1202 and the transceiver 1203, for example, may be connected to the memory 1202 and the transceiver 1203 through a communication bus.

The following describes in detail each component of the communication apparatus 1200 with reference to FIG. 12.

The processor 1201 is a control center of the communication apparatus 1200, and may be a processor, may be a collective name of a plurality of processing elements, or may be referred to as a logic circuit. For example, the processor 1201 is one or more central processing units (CPUs), may be an application-specific integrated circuit (ASIC), or is configured as one or more integrated circuits for implementing embodiments of this application, for example, one or more microprocessors (digital signal processors, DSPs) or one or more field programmable gate arrays (FPGAs).

Optionally, the processor 1201 may perform various functions of the communication apparatus 1200 by running or executing a software program stored in the memory 1202 and invoking data stored in the memory 1202.

During specific implementation, in an embodiment, the processor 1201 may include one or more CPUs, for example, a CPU 0 and a CPU 1 shown in FIG. 12.

During specific implementation, in an embodiment, the communication apparatus 1200 may alternatively include a plurality of processors, for example, the processor 1201 and a processor 1204 shown in FIG. 2. Each of the processors may be a single-CPU processor or may be a multi-CPU processor. The processor herein may be one or more devices, circuits, and/or processing cores configured to process data (for example, computer program instructions).

The memory 1202 is configured to store a software program for executing the solutions of this application, and the processor 1201 controls execution, so that the method shown in FIG. 4 is performed.

Optionally, the memory 1202 may be a read-only memory (ROM) or another type of static storage device that can store static information and instructions, or a random access memory (RAM), or another type of dynamic storage device that can store information and instructions, or may be an electrically erasable programmable read-only memory (EEPROM), a compact disc read-only memory (CD-ROM) or another compact disc storage, an optical disk storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, this is not limited thereto. The memory 1202 may be integrated with the processor 1201, or may exist independently, and is coupled to the processor 1201 through an interface circuit or an input/output interface (not shown in FIG. 12) of the communication apparatus 1200. This is not specifically limited in this embodiment of this application.

The transceiver 1203 is configured for communication with another communication apparatus. For example, the communication apparatus 1200 is a terminal, and the transceiver 1203 may be configured to communicate with a network device or communicate with another terminal device. For another example, the communication apparatus 1200 is a network device, and the transceiver 1203 may be configured to communicate with a terminal or communicate with another network device.

Optionally, the transceiver 1203 may include a receiver and a transmitter (not separately shown in FIG. 12). The receiver is configured to implement a receiving function, and the transmitter is configured to implement a sending function.

Optionally, the transceiver 1203 may be integrated with the processor 1201, or may exist independently, and is coupled to the processor 1201 through an interface circuit (not shown in FIG. 12) of the communication apparatus 1200. This is not specifically limited in this embodiment of this application.

In a possible implementation, the communication apparatus 1200 may further include an input/output interface and a logic circuit (not shown in FIG. 12).

In one aspect, the communication apparatus 1200 is applicable to the network device in the foregoing method embodiment, for example, the first network device, a chip (system) or another component or subassembly that may be disposed in the network device, or an apparatus including the network device. The input/output interface is configured to receive a first packet from a terminal. The logic circuit is configured to obtain a second packet. The input/output interface is further configured to send the second packet to a second network device. The second packet is a packet obtained by encapsulating security information in the first packet. The security information indicates that the second packet is a trusted packet determined by the communication apparatus.

Alternatively, in another aspect, the communication apparatus 1200 is applicable to the network device in the foregoing method embodiment, for example, the second network device, a chip (system) or another component or subassembly that may be disposed in the network device, or an apparatus including the network device. The input/output interface is configured to receive a second packet from a first network device. The logic circuit is configured to verify the second packet. Security information is encapsulated in the second packet, and the security information indicates that the second packet is a trusted packet determined by the first network device.

It should be noted that the structure of the communication apparatus 1200 shown in FIG. 12 does not constitute a limitation on the communication apparatus. An actual communication apparatus may include more or fewer components than those shown in the figure, combine some components, or have different component arrangements.

In addition, for a technical effect of the communication apparatus 1200, refer to the technical effect of the foregoing method embodiment. Details are not described herein again.

Figure 13:
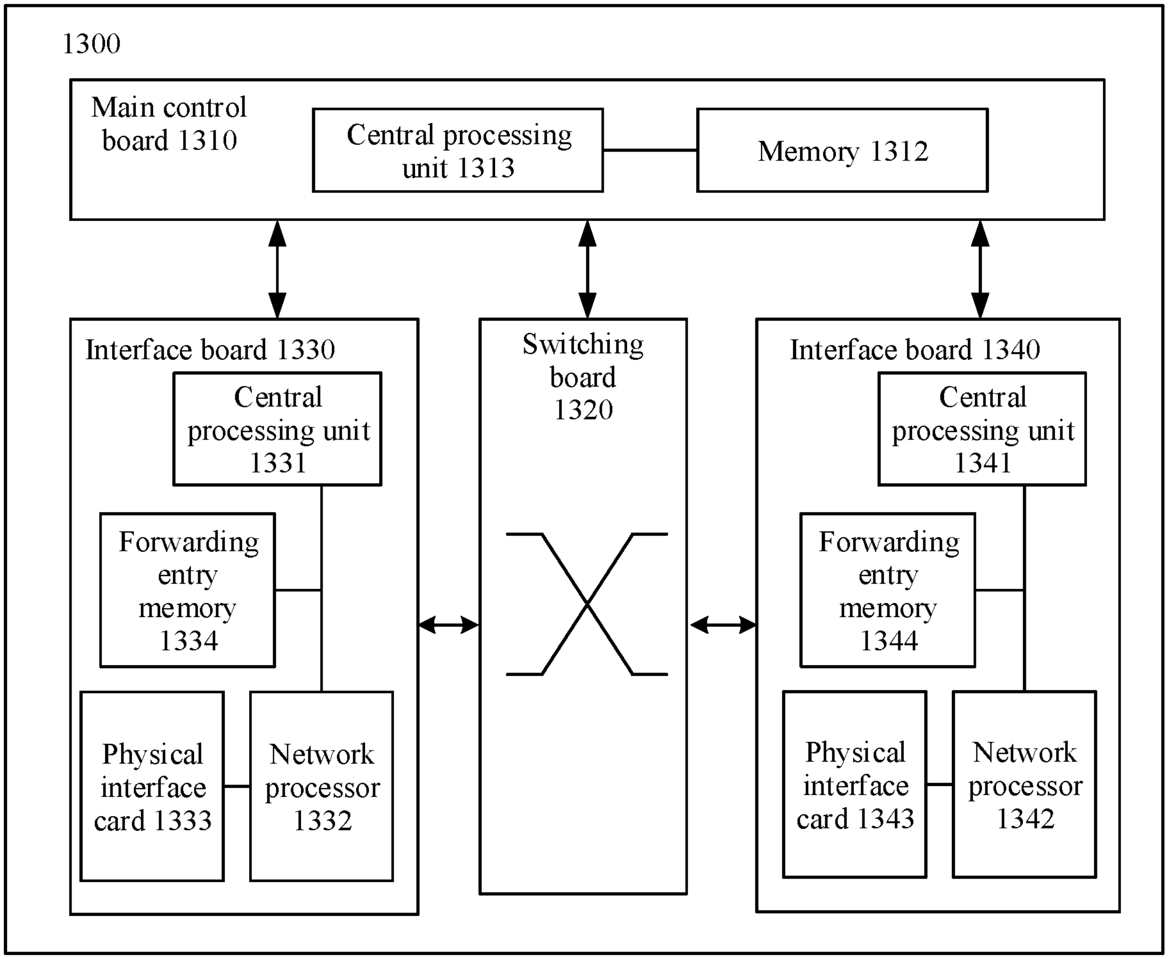
FIG. 13 is a schematic diagram 3 of a structure of a communication apparatus according to an embodiment of this application.

FIG. 13 is a schematic diagram 4 of a structure of the communication apparatus 1300 according to this application. The communication apparatus 1300 may be configured as the first network device or the second network device in the communication system shown in FIG. 3. The communication apparatus 1300 includes a main control board 1310 and an interface board 1330.

The main control board 1310 is also referred to as a main processing unit (MPU) or a route processor card. The main control board 1310 is configured to control and manage components in the communication apparatus 1300, including functions of route calculation, device management, device maintenance, and protocol processing. The main control board 1310 includes a central processing unit 1313 and a memory 1313.

The interface board 1330 is also referred to as a line processing unit (LPU), a line card, or a service board. The interface board 1330 is configured to provide various service interfaces and implement data packet forwarding. The service interfaces include but are not limited to an Ethernet interface and a POS (packet over SONET/SDH) interface. The Ethernet interface is, for example, a flexible Ethernet service interface (flexible Ethernet clients, FlexE Clients). The interface board 1330 includes a central processing unit 1331, a network processor 1332, a forwarding entry memory 1334, and a physical interface card (PIC) 1333.

The central processing unit 1331 on the interface board 1330 is configured to control and manage the interface board 1330, and communicate with the central processing unit 1313 on the main control board 1310.

The network processor 1332 is configured to implement packet forwarding. A form of the network processor 1332 may be a forwarding chip. Specifically, the network processor 1332 is configured to forward a received packet, for example, forward the first packet or the second packet, based on a forwarding table stored in the forwarding entry memory 1334, for example, a forwarding table corresponding to the first packet or the second packet. If a destination address of the packet is an address of the communication apparatus 1300, the packet is sent to the CPU (for example, the central processing unit 1313) for processing. If a destination address of the packet is not an address of the communication apparatus 1300, a next hop and an outbound interface corresponding to the destination address are found from the forwarding table based on the destination address, and the packet is forwarded to the outbound interface corresponding to the destination address. In this way, the packet is forwarded to the corresponding next hop, for example, the second packet is sent to the second device, or a third packet is sent to a third device. Processing of an uplink packet includes: processing an inbound interface of the packet, and searching the forwarding table. Processing of a downlink packet includes: searching the forwarding table, and the like.

The physical interface card 1333 is configured to implement a physical layer interconnection function. Original traffic enters the interface board 1330 from the physical interface card 1333, and a processed packet is sent from the physical interface card 1333. The physical interface card 1333 is also referred to as a subcard, may be installed on the interface board 1330, and is responsible for converting an optical/electrical signal into a packet, performing legitimacy check on the packet, and forwarding the packet to the network processor 1332 for processing. In some embodiments, the central processing unit may also implement a function of the network processor 1332, for example, implement software forwarding based on a general-purpose CPU, so that the network processor 1332 is not required in the physical interface card 1333.

Optionally, the communication apparatus 1300 includes a plurality of interface boards. For example, the communication apparatus 1300 further includes an interface board 1340. The interface board 1340 includes a central processing unit 1341, a network processor 1342, a forwarding entry memory 1344, and a physical interface card 1343.

Optionally, the communication apparatus 1300 further includes a switching board 1320. The switching board 1320 may also be referred to as a switch fabric unit (SFU). When the communication apparatus 1300 has a plurality of interface boards 1330, the switching board 1320 is configured to complete data exchange between the interface boards. For example, the interface board 1330 and the interface board 1340 may communicate with each other through the switching board 1320.

The main control board 1310 is coupled to the interface board 1330. For example, the main control board 1310, the interface board 1330, the interface board 1340, and the switching board 1320 are connected to a system backplane through a system bus to implement interworking. In a possible implementation, an inter-process communication (IPC) channel is established between the main control board 1310 and the interface board 1330, and the main control board 1310 and the interface board 130 communicate with each other through the IPC channel.

Logically, the communication apparatus 1300 includes a control plane and a forwarding plane. The control plane includes the main control board 1310 and the central processing unit 1331, and the forwarding plane includes components that perform forwarding, for example, the forwarding entry memory 1334, the physical interface card 1333, and the network processor 1332. The control plane implements functions of a router, generating a forwarding table, processing signaling and protocol packets, and configuring and maintaining a status of a device. The control plane delivers the generated forwarding table to the forwarding plane. On the forwarding plane, the network processor 1332 performs table lookup and forwarding on a packet received by the physical interface card 1333 based on the forwarding table delivered by the control plane. The forwarding table delivered by the control plane may be stored in the forwarding entry memory 1334. In some embodiments, the control plane and the forwarding plane may be completely separated, and are not on a same device.

If the communication apparatus 1300 is configured as the first network device, the physical interface card 1333 receives the first packet from a terminal, and sends the first packet to the network processor 1332. The network processor 1332 encapsulates security information in the first packet to obtain the second packet, and sends the second packet to the second network device by using the physical interface card 1333.

If the communication apparatus 1300 is configured as the second network device, the physical interface card 1333 receives the second packet from the first network device, and sends the second packet to the network processor 1332. After verifying the second packet, the network processor 1332 may strip off the security information carried in the second packet. An internal reachable address of the third device is encapsulated in the second packet, to obtain the third packet, and the third packet is sent to the second device by using the physical interface card 1333.

In this embodiment of this application, an operation on the interface board 1340 is the same as an operation on the interface board 1330. For brevity, details are not described again. The communication apparatus 1300 in this embodiment may correspond to the first network device in the foregoing method embodiments. The main control board 1310, the interface board 1330, and/or the 1340 in the communication apparatus 1300 may implement functions of and/or steps performed by the first network device or the second network device in the foregoing method embodiments. For brevity, details are not described herein again.

It should be noted that there may be one or more main control boards, and when there are a plurality of main control boards, a primary main control board and a secondary main control board may be included. There may be one or more interface boards. A network device with a stronger data processing capability provides a larger quantity of interface boards. There may also be one or more physical interface cards on the interface board. There may be no switching board or one or more switching boards. When there are a plurality of switching boards, load balancing and redundancy backup may be implemented together. In a centralized forwarding architecture, a network device may not need a switching board, and an interface board performs a function of processing service data of an entire system. In a distributed forwarding architecture, a network device may have at least one switching board, and implements data exchange between a plurality of interface boards by using the switching board, to provide a large-capacity data exchange and processing capability. Therefore, a data access and processing capability of the network device in the distributed architecture is better than that of the device in the centralized architecture. Optionally, the network device may alternatively be in a form in which there is only one card. To be specific, there is no switching board, and functions of the interface board and the main control board are integrated on the card. In this case, a central processing unit on the interface board and a central processing unit on the main control board may be combined to form one central processing unit on the card, to perform functions obtained after the two central processing units are combined. This form of device (for example, a network device such as a low-end switch or a router) has a weak data exchange and processing capability. A specific architecture that is to be used depends on a specific networking deployment scenario. This is not limited herein.

In some possible embodiments, the first network device or the second network device may be implemented as a virtualized device. The first network device is used as an example. For example, the virtualized device may be a virtual machine (VM) on which a program having a packet sending function is run. The virtual machine is deployed on a hardware device (for example, a physical server). The virtual machine is a complete software-simulated computer system that has complete hardware system functions and that runs in an entirely isolated environment. The virtual machine may be configured as the first network device. For example, the first network device may be implemented based on a general-purpose physical server in combination with a network functions virtualization (NFV) technology. The first network device is a virtual host, a virtual router, or a virtual switch. After reading this application, with reference to the NFV technology, a person skilled in the art may virtualize, on the general-purpose physical server, the first network device having the foregoing functions. Details are not described herein.

For example, the virtualized device may be a container, and the container is an entity used to provide an isolated virtualized environment. For example, the container may be a docker container. The container may be configured as the first network device. For example, the first network device may be created by using a corresponding image. For example, one container instance, for example, a container instance proxy-container 1, may be created for a proxy-container by using an image of the container (proxy-container) that provides a proxy service. The container instance proxy-container 1 is provided as the first network device. When a container technology is used for implementation, the first network device may run by using a kernel of a physical machine, and a plurality of first network devices may share an operating system of the physical machine. Different first network devices may be isolated by using the container technology. A containerized first network device may run in a virtualized environment, for example, may run in a virtual machine, or a containerized first network device may directly run in a physical machine.

For example, the virtualized device may be a pod, and the pod is a container orchestration engine (kubernetes, K8s) that is a basic unit for deploying, managing, and orchestrating a containerized application. The pod may include one or more containers. All containers in a same pod are usually deployed on a same host. Therefore, all the containers in the same pod may communicate with each other through the host, and may share storage resources and network resources of the host. The pod may be configured as the first network device. For example, specifically, a container as a service (CaaS) may be instructed to create a pod, and the pod is provided as a routing management device.

Certainly, the first network device may alternatively be another virtualized device. This is not enumerated herein one by one.

In some possible embodiments, the first network device may alternatively be implemented by a general-purpose processor. For example, the general-purpose processor may be in a form of a chip. Specifically, the general-purpose processor implementing the first network device includes a processing circuit, and an input interface and an output interface that are internally connected to and communicated with the processing circuit. The processing circuit is configured to perform the packet generation step in the foregoing method embodiments through the input interface. The processing circuit is configured to perform the receiving step in the foregoing method embodiments through the input interface. The processing circuit is configured to perform the sending step in the foregoing method embodiments through the output interface. Optionally, the general-purpose processor may further include a storage medium, and the processing circuit is configured to perform the storage step in the foregoing method embodiments by using the storage medium. The storage medium may store instructions executed by the processing circuit, and the processing circuit is configured to execute the instructions stored in the storage medium, to perform the foregoing method embodiments.

An embodiment of this application provides a communication system. The communication system includes one or more terminals and one or more network devices. This application further provides a communication system. The communication system may include the foregoing first network device and the foregoing second network device. The communication system may be configured to implement operations performed by the first network device and the second network device in any one of the foregoing method embodiment and the possible implementations of the method embodiment. For example, the communication system may have the structure shown in FIG. 3.

An embodiment of this application further provides a computer-readable storage medium. The computer-readable storage medium stores a computer program or instructions, and the computer program or the instructions are executed by a computer (for example, a processor), to implement some or all steps of any method performed by any apparatus in embodiments of this application.

An embodiment of this application provides a computer program product. When the computer program product runs on a computer, the computer is enabled to perform the method in the foregoing method embodiment.

The foregoing apparatuses in various product forms have any function of the first network device in the foregoing method embodiment. Details are not described herein again.

A person of ordinary skill in the art may be aware that, the method steps and units that are described with reference to embodiments disclosed in this specification can be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, the disclosed systems, apparatuses and methods may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units. To be specific, the components may be located at one location, or may be distributed on a plurality of network units. Some or all of the units may be selected based on actual requirements to achieve the objectives of the solutions in embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement embodiments, all or some of embodiments may be implemented in a form of a computer program product. The computer program product includes one or more computer program instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A method, applied to a first network device, the method comprising:

receiving a first packet from a terminal;

determining, by the first network device, first verification information based on a verification algorithm, anti-replay information, and a first key; and sending a second packet to a second network device, wherein the second packet is obtained by encapsulating security information in the first packet, and the security information indicates that the second packet is a trusted packet determined by the first network device, wherein the security information comprises the first verification information, and the first verification information is authentication code or password protection information determined by the first network device.

2. The method according to claim 1, wherein the first verification information indicates that the second packet is the trusted packet determined by the first network device.

3. The method according to claim 2, wherein the security information further comprises second verification information comprising one or more of the following:
an identifier of the verification algorithm;
the anti-replay information;
an identifier of the first network device;
a key ciphertext;
an identifier of the second network device;
an internal reachable address of a third device; or
first indication information, wherein
the third device is a downstream device of the second network device, and
the first indication information indicates a type of the security information.

4. The method according to claim 3, wherein the second verification information further comprises second indication information indicating whether the security information comprises one or more of the following:
the identifier of the verification algorithm;
the anti-replay information;
the identifier of the first network device; or
the key ciphertext.

5. The method according to claim 4, further comprising, before sending the second packet to the second network device, receiving first configuration information from a network controller, wherein the first configuration information comprises one or more of the following:
a public address of the third device;
the first verification information;
the verification algorithm;
the identifier of the verification algorithm;
the anti-replay information;
a first key;
the identifier of the first network device;
the key ciphertext;
the identifier of the second network device;
the internal reachable address of the third device;
the first indication information; or
the second indication information, wherein the verification algorithm, the anti-replay information, and the first key are used to determine the first verification information.

6. The method according to claim 3, wherein:
the second verification information further comprises second indication information; and
the second indication information indicates a location or a length of one or more of the following in the second packet:
the first verification information,
the identifier of the verification algorithm,
the anti-replay information,
the identifier of the first network device, or
the key ciphertext.

7. The method according to claim 3, wherein:
the first verification information is in a header or a tail of the second packet; and
the second verification information is in the header or the tail of the second packet.

8. The method according to claim 3, wherein:
the second packet is an internet protocol version 4 (IPV4) packet and the second verification information is located between an IPV4 header and a payload of the IPV4 packet; or
an internet protocol version 6 (IPv6) packet and the second verification information is located in an extension header of an IPV6 protocol header of the IPV6 packet.

9. The method according to claim 3, wherein:
destination addresses of the first packet and the second packet are a public address of the third device; and
the public address of the third device points to the third device, but is unreachable to the third device.

10. The method according to claim 1, wherein:
the first network device is any one of a router, a gateway, or a switch; and
the second network device is a router.

11. A method applied to a second network device, the method comprising:
receiving a second packet from a first network device, wherein security information is encapsulated in the second packet, and the security information indicates that the second packet is a trusted packet determined by the first network device; and
verifying the second packet comprising:
determining third verification information based on second verification information comprised in the security information; and
verifying the second packet based on first verification information comprised in the security information, the first verification information indicating that the second packet is the trusted packet determined by the first network device.

12. The method according to claim 11, wherein the second verification information further includes one or more of the following:
an identifier of a verification algorithm;
anti-replay information;
an identifier of the first network device;
a key ciphertext;
an identifier of the second network device;
an internal reachable address of a third device; or
first indication information, wherein the first indication information indicates a type of the security information.

13. The method according to claim 12, wherein the second verification information further comprises second indication information that indicates whether the security information comprises one or more of the following:
the identifier of the verification algorithm;
the anti-replay information;
the identifier of the first network device; or
the key ciphertext.

14. The method according to claim 12, wherein:
the second verification information further comprises second indication information; and
the second indication information indicates a location or a length of one or more of the following in the second packet:
the first verification information,
the identifier of the verification algorithm,
the anti-replay information,
the identifier of the first network device, or
the key ciphertext.

15. The method according to claim 12, wherein:
the first verification information is in a header or a tail of the second packet; and
the second verification information is in the header or the tail of the second packet.

16. The method according to claim 12, wherein:

the second packet is an internet protocol version 4 (IPv4) packet and the second verification information is located between an IPV4 header and a payload of the IPV4 packet; or the second packet is an internet protocol version 6 (IPv6) packet and the second verification information is located between an IPv6 header and a payload of the IPv6 packet when the second packet is the IPv6 packet.

17. The method according to claim 12, wherein verifying the second packet based on the first verification information and the third verification information comprises:

in response to the first verification information being the same as the third verification information:

updating, by the second network device, a destination address of the second packet to the internal reachable address of the third device to obtain a third packet, and sending the third packet to the third device; and in response to the first verification information being different from the third verification information, discarding, by the second network device, the second packet.

18. The method according to claim 12, wherein determining the third verification information based on the second verification information comprises:

determining whether the security information comprises the identifier of the first network device; and in response to determining that the security information comprises the identifier of the first network device, determining the third verification information based on the second verification information.

19. The method according to claim 12, wherein determining the third verification information based on the second verification information comprises:

determining, by the second network device, a second key based on the key ciphertext or the identifier of the first network device; and determining, by the second network device, the third verification information based on the verification algorithm, the anti-replay information, and the second key.

20. The method according to claim 19, further comprising:

before verifying the second packet, receiving second configuration information from a network controller, wherein the second configuration information comprises one or more of the following:

the internal reachable address of the third device, the identifier of the second network device, the identifier of the first network device, or a third key, wherein the third key is used to decrypt the key ciphertext to obtain the second key.

21. The method according to claim 11, wherein:

the first network device is any one of: a router, a gateway, or a switch; and the second network device is a router.

22. An apparatus, comprising:

a processor; and a memory with program instructions stored thereon, wherein the instructions, when executed by the processor, enable the apparatus to:

receive a first packet from a terminal;

determine first verification information based on a verification algorithm, anti-replay information, and a first key;

obtain a second packet, wherein the second packet is obtained by encapsulating security information in the first packet, and the security information indicates that the second packet is a trusted packet determined by the apparatus, wherein the security information comprises the first verification information, and the first verification information is authentication code or password protection information determined by the apparatus; and send the second packet to a second network device.

23. The apparatus according to claim 22, wherein the security information further comprises second verification information indicating one or more of the following:

an identifier of the verification algorithm, the anti-replay information, an identifier of the apparatus, a key ciphertext, an identifier of the second network device, an internal reachable address of a third device, or first indication information, wherein the third device is a downstream device of the second network device, and the first indication information indicates a type of the security information.

24. The apparatus according to claim 23, wherein the second verification information further comprises second indication information indicating whether the security information comprises one or more of the following:

the identifier of the verification algorithm, the anti-replay information, the identifier of the apparatus, or the key ciphertext.

25. An apparatus, comprising:

a processor; and a memory with program instructions stored thereon, wherein the instructions, when executed by the processor, enable the apparatus to:

receive a second packet from a first network device, wherein security information is encapsulated in the second packet, and the security information indicates that the second packet is a trusted packet determined by the first network device; and verify the second packet by:

determining third verification information based on second verification information comprised in the security information, and verifying the second packet based on first verification information comprised in the security information, the first verification information indicating that the second packet is the trusted packet determined by the first network device.

26. The apparatus according to claim 25, wherein the second verification information further comprises one or more of the following:

an identifier of a verification algorithm, anti-replay information, an identifier of the first network device, a key ciphertext, an identifier of the apparatus, an internal reachable address of a third device, or first indication information, wherein the first indication information indicates a type of the security information.

27. The apparatus according to claim 26, wherein:

the second verification information further comprises second indication information; and the second indication information indicates a location or a length of one or more of the following in the second packet:

the first verification information,
the identifier of the verification algorithm,
the anti-replay information,
the identifier of the first network device, or
the key ciphertext.

28. The apparatus according to claim 26, wherein:
the first verification information is in a header or a tail of the second packet; and
the second verification information is in the header or the tail of the second packet.

29. The apparatus according to claim 26, wherein:
the second packet is an internet protocol version 4 (IPV4) packet and the second verification information is located between an IPV4 header and a payload of the IPV4 packet; or
the second packet is an internet protocol version 6 (IPv6) packet and the second verification information is located between an IPV6 header and a payload of the IPV6 packet when the second packet is the IPV6 packet.

30. The apparatus according to claim 26, wherein verifying the second packet based on the first verification information and the third verification information comprises:
in response to the first verification information being the same as the third verification information:
updating a destination address of the second packet to the internal reachable address of the third device to obtain a third packet, and
sending the third packet to the third device; and
in response to the first verification information being different from the third verification information, discarding the second packet.

* * * * *